US010922578B2

United States Patent
Banerjee et al.

(10) Patent No.: US 10,922,578 B2
(45) Date of Patent: Feb. 16, 2021

(54) CHANGE DETECTION BASED IMAGERY ACQUISITION TASKING SYSTEM

(71) Applicant: Google Inc., Mountain View, CA (US)

(72) Inventors: Sujoy Banerjee, San Francisco, CA (US); Yan Mayster, Aurora, CO (US); Brian Edmond Brewington, Superior, CO (US)

(73) Assignee: Google LLC, Mountain View, CA (US)

( * ) Notice: Subject to any disclaimer, the term of this patent is extended or adjusted under 35 U.S.C. 154(b) by 144 days.

(21) Appl. No.: 15/560,640

(22) PCT Filed: Aug. 24, 2016

(86) PCT No.: PCT/US2016/048391
§ 371 (c)(1),
(2) Date: Sep. 22, 2017

(87) PCT Pub. No.: WO2018/038720
PCT Pub. Date: Mar. 1, 2018

(65) Prior Publication Data
US 2018/0253621 A1 Sep. 6, 2018

(51) Int. Cl.
*G06K 9/46* (2006.01)
*G06F 16/29* (2019.01)
(Continued)

(52) U.S. Cl.
CPC ......... *G06K 9/4642* (2013.01); *G06F 16/29* (2019.01); *G06F 16/583* (2019.01);
(Continued)

(58) Field of Classification Search
None
See application file for complete search history.

(56) References Cited

U.S. PATENT DOCUMENTS

| 4,912,770 A | 3/1990 | Seto et al. |
| 4,984,279 A | 1/1991 | Kidney et al. |

(Continued)

FOREIGN PATENT DOCUMENTS

| CN | 104778719 | 7/2015 |
| EP | 2077542 | 7/2009 |

(Continued)

OTHER PUBLICATIONS

PCT International Search Report for PCT/US2016/048391, dated Jun. 1, 2017—13 pages.
PCT International Search Report for PCT/US2016/048411, dated Mar. 20, 2017—13 pages.
Boriah, "Time Series Change Detection: Algorithms for Land Cover Change," Dissertation Submitted to University of Minnesota, Apr. 2010—160 pages.

(Continued)

*Primary Examiner* — Kevin Ky
(74) *Attorney, Agent, or Firm* — Dority & Manning, PA

(57) ABSTRACT

Systems and methods for tasking an image acquisition system are provided. In one embodiment, a method includes obtaining data descriptive of a plurality of images associated with a geographic area. The method includes analyzing at least a subset of the plurality of images to determine an occurrence of one or more changes associated with the geographic area. The method includes determining a level of change associated with the geographic area based, at least in part, on the occurrence of the one or more changes associated with the geographic area. The method includes providing a control command to an image acquisition system to adjust an acquisition of imagery data associated with the geographic area based, at least in part, on the level of change.

20 Claims, 9 Drawing Sheets

(51) Int. Cl.
*G06F 16/583* (2019.01)
*G06K 9/00* (2006.01)
*G06T 1/00* (2006.01)
*G06T 7/00* (2017.01)
*H04W 4/02* (2018.01)

(52) U.S. Cl.
CPC .......... *G06K 9/0063* (2013.01); *G06T 1/0007* (2013.01); *G06T 7/0002* (2013.01); *H04W 4/02* (2013.01); *G06T 2207/10032* (2013.01)

(56) References Cited

U.S. PATENT DOCUMENTS

| | | | |
|---|---|---|---|
| 6,335,976 | B1 | 1/2002 | Belmares |
| 6,661,838 | B2 | 12/2003 | Koga et al. |
| 7,270,299 | B1 | 9/2007 | Murphy |
| 7,528,938 | B2 | 5/2009 | Garceau et al. |
| 7,650,047 | B2 | 1/2010 | Jin et al. |
| 7,990,804 | B2 | 8/2011 | Gendron et al. |
| 8,144,937 | B2 | 3/2012 | Zimmer et al. |
| 8,243,551 | B2 | 8/2012 | Gendron et al. |
| 8,379,913 | B1 * | 2/2013 | Robinson ............ G06K 9/6254 382/100 |
| 8,548,248 | B2 | 10/2013 | Mitchell et al. |
| 9,886,771 | B1 * | 2/2018 | Chen .................... G06T 7/0032 |
| 2008/0278508 | A1 | 11/2008 | Anderson et al. |
| 2010/0098342 | A1 * | 4/2010 | Davis .................. G06K 9/0063 382/220 |
| 2011/0256886 | A1 * | 10/2011 | Velusamy ............. G01S 5/0009 455/456.1 |
| 2012/0092493 | A1 * | 4/2012 | Tsutsui ................... H04N 7/185 348/143 |
| 2013/0287307 | A1 | 10/2013 | Omer et al. |
| 2014/0064554 | A1 | 3/2014 | Coulter et al. |
| 2015/0003710 | A1 | 1/2015 | Masumoto et al. |
| 2015/0371389 | A1 | 12/2015 | Siegel et al. |
| 2017/0034470 | A1 * | 2/2017 | Kleinrock .......... H04N 5/23238 |
| 2017/0309171 | A1 * | 10/2017 | Zhao ....................... G01S 19/13 |

FOREIGN PATENT DOCUMENTS

| | | |
|---|---|---|
| JP | 2007114422 | 5/2007 |
| JP | 2011022004 | 2/2011 |
| JP | 2013152383 | 8/2013 |
| WO | WO2010/105935 | 9/2010 |
| WO | WO2012/017187 | 2/2012 |

OTHER PUBLICATIONS

Calandrelli, "Astro Digital Releases Platform for Anyone to Analyze Satellite Imagery", posted Feb. 24, 2016, https://techcrunch.com/2016/02/24/astro-digital-releases-platform-for-anyone-to-analyze-satellite-imagery/—9 pages.

Carbone et al. "Automatic Generation of Frequently Updated Land Cover Products at National Level Using COSMO-SkyMed SAR Imagery," 2016 IEEE International Geoscience and Remote Sensing Symposium, Beijing, China, Jul. 10-15, 2016, pp. 3406-1409.

Coulter, "Detailed Change Detection Using High Spatial Resolution Frame Center Matched Aerial Photography," 20th Biennial Workshop on Aerial Photography, Videography, and High Resolution Digital Imagery for Resource Assessment, Oct. 4-6, 2005, Weslaco, Texas—12 pages.

Coulter et al., "Near Real-Time Change Detection for Border Monitoring," The American Society for Photogrammetry and Remote Sensing Annual Conference, Milwaukee, Wisconsin, May 1-5, 2011—9 pages.

Crawford, "Leveraging Geospatial Big Data with Artificial Intelligence," Case Study, www.digitalglobe.com/geobigdata—11 pages.

De Jonge et al. "Time Patterns, Geospatial Clustering and Mobility Statistics Based on Mobile Phone Network Data," Chapter 12, Discussion Paper, Statistics Netherlands, The Hague/Heerlen, 2012—26 pages.

DigitalGlobe, "Machine Learning Meets Geospatial Big Data," May 31, 2016—5 pages.

Hussain et al. "Change Detection from Remotely Sensed Images: From Pixel-Based to Object-Based Approaches." ISPRS Journal of Photogrammetry and Remote Sensing 80, 2013, pp. 91-106.

Kim, "Satellite Mapping and Automated Feature Extraction: Geographic Information System-Based Change Detection of the Antarctic Coast," Dissertation Submitted to Ohio State University, 2004—171 pages.

Olanoff, "Satellite Imagery Company Skybox Teams up with Mapbox for Analysis and Annotation of Data," posted Apr. 24, 2013, https://techcrunch.com/2013/04/24/satellite-imagery-company-skybox-teams-with-mapbox-for-analysis-and-annotation-of-data/, accessed on Jun. 28, 2016—6 pages.

Troglio et al., "Unsupervised Change-Detection in Retinal Images by a Multiple-Classifier Approach," International Workshop on Multiple Classifier Systems, Cairo, Egypt, Apr. 7-9, 2010, pp. 94-103.

Written Opinion of the International Preliminary Examining Authority for PCT/US2016/048391 dated Jul. 12, 2018, 8 pages.

\* cited by examiner

CHANGE DETECTION BASED IMAGERY ACQUISITION TASKING SYSTEM

FIELD

The present disclosure relates generally to tasking an image acquisition system, and more particularly to tasking an image acquisition system based, at least in part, on machine-learned change detection of a geographic area.

BACKGROUND

Images of geographic locations can be used for a variety of purposes, such as geographic user interfaces, navigation systems, online search responses, etc. These images can be acquired, for example, by satellites programmed to capture imagery of particular geographic locations. In some cases, the frequency of image capture associated with a particular location can depend on online user impressions. For example, the more often users search for a particular location and/or view the location within a user interface, the more frequent a system of satellites may acquire images of the location. This approach may not, however, accurately capture which areas are undergoing the greatest amount of change.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of tasking an image acquisition system. The method includes obtaining, by one or more computing devices, data descriptive of a plurality of images associated with a geographic area, each image depicting at least a portion of the geographic area, and each image having been captured at a different time. The method further includes analyzing, by the one or more computing devices, at least a subset of the plurality of images to determine an occurrence of one or more changes associated with the geographic area. The method includes determining, by the one or more computing devices, a level of change associated with the geographic area based at least in part on the occurrence of the one or more changes associated with the geographic area. The method further includes providing, by the one or more computing devices, a control command to an image acquisition system to adjust an acquisition of imagery data associated with the geographic area based at least in part on the level of change.

Another example aspect of the present disclosure is directed to a computing system for tasking an image acquisition system. The system comprises at least one processor and at least one tangible, non-transitory computer-readable medium that stores instructions that, when executed by the at least one processor, cause the computing system to obtain data descriptive of a plurality of images, each image depicting at least a portion of the geographic area, and each image having been captured at a different time. The instructions cause the system to analyze at least a subset of the plurality of images to determine an occurrence of one or more changes associated with the geographic area. The instructions cause the system to determine a level of change associated with the geographic area based at least in part on the occurrence of one or more changes associated with the geographic area. The instructions cause the system to provide a control command to an image acquisition system to adjust an acquisition of imagery data associated with the geographic area based at least in part on the level of change.

Other example aspects of the present disclosure are directed to systems, apparatuses, tangible, non-transitory computer-readable media, user interfaces, memory devices, and electronic devices for tasking an image acquisition system.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
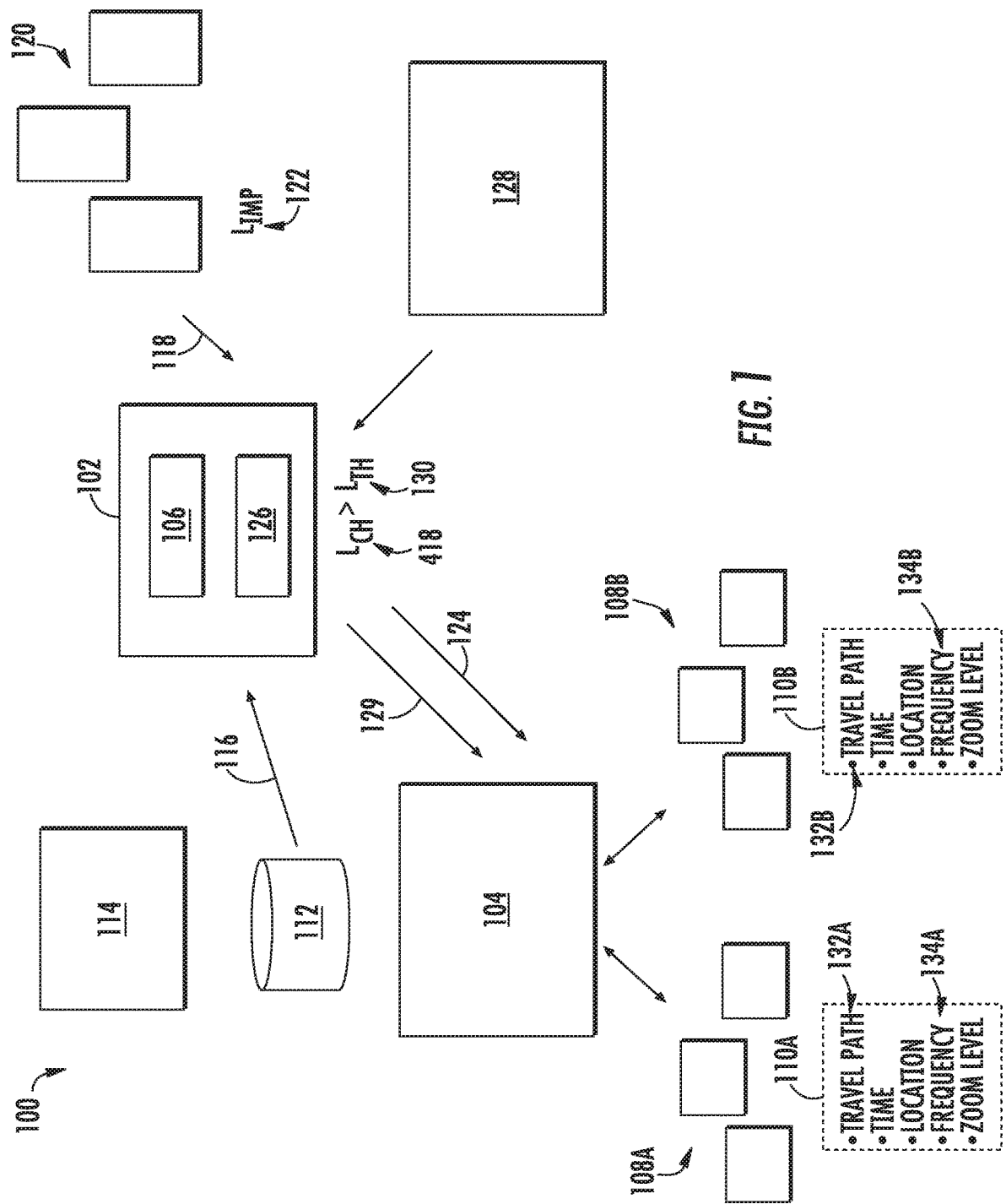
FIG. 1 depicts an example system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to tasking an image acquisition system based, at least in part, on the detection of change within a geographic area. For instance, a machine learning computing system with one or more machine-learned model(s) can receive a plurality of images associated with a particular geographic area, such as, a residential neighborhood. Each of the images can be captured at a different time (e.g., separated by daily, weekly, monthly, yearly time periods). The computing system can analyze the images to determine the occurrence of a change within the neighborhood. In particular, in one example, the computing system can use a machine-learned binary classifier model to evaluate the images to identify a change in buildings, roads, etc. associated within various sub-regions (e.g., land plots) within the neighborhood. The computing system can aggregate the detected changes (or lack thereof) within each of the sub-regions to determine an overall level of change associated with the neighborhood. The computing system can task an image acquisition system to adjust its acquisition of imagery data with respect to the geographic area based, at least in part, on the determined level of change. For example, if numerous buildings and/or roads are being added to the neighborhood, the image acquisition system can increase the frequency with which images of the neighborhood are obtained (e.g., by aerial platforms). If, however, the neighborhood is experiencing a low level of change, or no change at all, the image acquisition system can decrease the frequency with which images of the neighborhood are obtained. In this way, an image acquisition system can receive an increased level of guidance on how and where to acquire new imagery data and its acquisition resources can be more efficiently allocated.

More particularly, an example system according to aspects of the present disclosure can include a machine learning computing system and an image acquisition system. The computing system can obtain data descriptive of a plurality of images associated with a geographic area, each image depicting at least a portion of the geographic area. The geographic area can include a region of a celestial body (e.g., Earth, moon, Mars, other body), region of a country, a state, a municipality, an area defined by land boundaries, a neighborhood, a subdivision, a school district, a shopping center, an office park, etc. In some implementations, the computing system can obtain the image data from an accessible image database that stores imagery of geographic areas. The image database can be associated with the computing system itself, the image acquisition system, and/or another computing system, separate from the machine learning computing system and the image acquisition system.

The image database can store various types of image data associated with geographic areas. For instance, the image data can include ground-level images (e.g., street-level panoramic images, sets of light detection and ranging (LIDAR) data, other imagery at or near the level of the ground) as well as overhead images (e.g., images with overhead view). The images can be optical images, infrared images, LIDAR data images, hyperspectral images, or any other type of imagery. Moreover, the images can be acquired by image-capturing platforms, such as street-level platforms (e.g., automobiles) and/or aerial platforms (e.g., aircrafts, UAVs, satellites). For example, the image database can store images that were previously captured by the image acquisition system. Additionally, and/or alternatively, the images can be user submitted imagery (e.g., photographs). The machine learning computing system can access like images (from the image database) to facilitate the comparison of imagery as described herein (e.g., overhead to overhead images).

In some implementations, the computing system can identify a geographic area of interest based, at least in part, on location data. For instance, the computing system can obtain location data associated with a plurality of user devices (e.g., phones, tablets, other mobile computing devices). The location data can be descriptive of a location associated with the user device. For instance, the location data can include one or more raw location report(s) that include a geocode that identifies a latitude and longitude associated with the user device. This can allow the computing system to determine a level of importance associated with a particular geographic area. By way of example, the location data can indicate that a high number of users have been recently visiting a particular neighborhood (or subdivision within the neighborhood). The high amount of user traffic can be indicative of a high level of importance (e.g., user interest, potential area of change) associated with the neighborhood. As such, the computing system can identify the neighborhood as a geographic area of interest for which it should determine the occurrence of change.

The computing system can analyze at least a subset of the plurality of images to determine an occurrence of one or more change(s) associated with the geographic area. For instance, the computing system can analyze the images to determine a change in infrastructure, such as the addition of new buildings and/or roads, ongoing building and/or road construction, the removal of buildings and/or roads, ongoing building and/or road destruction, etc. To do so, the computing system can utilize a machine-learned binary classifier model to detect change within the geographic area. The binary classifier model can be a machine-learned model or can otherwise include various machine-learned models such as neural networks (e.g., deep neural networks) or other multi-layer non-linear models.

The binary classifier model can be trained to detect the occurrence of a change within the geographic area by examining at least some of the images of the geographic area. For instance, the computing system can split a first image of the geographic area into a first plurality of cells and a second image of the geographic area into a second plurality of cells. The computing system can select a first cell from the first plurality of cells and a corresponding second cell from the second plurality of cells. Each cell can depict a target sub-region (e.g., land plot) of the larger geographic area (e.g., neighborhood). For example, the first cell and the second cell can be associated with the same (or similar) target, sub-region of the geographic area. The computing system can input data descriptive of the first and second cells into the machine-learned binary classifier model. This data can include the portion of the image (e.g., the individual pixels) represented in the individual cell, and/or be descriptive of the visual characteristics associated therewith.

The model can identify an occurrence of a change (e.g., building churn, road churn) associated with the target, sub-region. For example, the model can be trained to identify the occurrence of the change associated with the target, sub-region by comparing one or more visual characteristics (e.g., pixel color, intensity, depicted objects) of the first and second cells. The model can classify the occurrence of the change in a binary manner such as whether change has occurred between the time the images were captured (e.g., "1") or whether change has not occurred (e.g., "0"). The binary classifier model can generate an output descriptive of whether change (e.g., building construction) has occurred within the land plot. This process can be repeated for other cells of the images to identify the occurrence of change within multiple target, sub-regions of the neighborhood.

The computing system can determine a level of change associated with the geographic area. The level of change can represent the overall change experienced by the geographic area during a time period, based on the changes that have occurred in the sub-regions of the geographic area. For instance, the computing system can determine the level of change associated with the geographic area (e.g., neighborhood) by aggregating the change occurrences determined for each target sub-region (e.g., land plots). In some implementations, the overall level of change for a geographic area can be determined by adding the binary classifications (e.g., 0, 1) determined for each target, sub-region of the geographic area. For example, the geographic area can be divided into 224 cells, each depicting a target sub-region. The binary classifier model can determine that 150 of those target, sub-regions are not experiencing change (e.g., outputting a "0"), while 74 of the target, sub-regions are experiencing change (e.g., outputting a "1"). The overall level of change for the geographic area can, thus, be 74, representing a summation of the binary classifications (e.g., 150 "0's"+74 "1's"). This value can further be normalized (e.g., 74/(74+150)=0.33) to normalize away the size of cell. As will be further described herein, the computing system can determine the overall level of change using other approaches, such as per square distance and/or using weighted approaches.

The computing system can compare the overall level of change associated with the geographic area to a threshold. The threshold can be indicative of a significant level of change and/or a rate of change such that the acquisition of imagery of the geographic area should be adjusted. Depending, at least in part, on the level of change and the threshold, the computing system can adjust the acquisition of imagery data associated with the geographic region.

The computing system can provide a control command to the image acquisition system to adjust an acquisition of imagery data associated with the geographic area based, at least in part, on the level of change. For instance, in the event that the level of change associated with the geographic area is high (e.g., above the threshold), the control command can instruct the image acquisition system to increase the acquisition of imagery data associated with the geographic area. In the event that the level of change is low (or no change has occurred), the computing system can instruct the image acquisition system to maintain the current approach or decrease the acquisition of imagery data associated with the geographic area. The image acquisition system can receive the control command and adjust imagery acquisition accordingly. To implement such a change in imagery acquisition, the image acquisition system can adjust an acquisition pattern associated with a street-level platform and/or aerial platform. For example, the travel pattern (e.g., driving path, flight trajectory) and/or image capture frequency associated with the image-capturing platform can be adjusted such that the platform can capture images associated with the geographic area (e.g., neighborhood) more often.

In some implementations, the computing system can instruct the image acquisition system to adjust the spatial resolution of images when capturing images of the geographic area. For example, the spatial resolution may be increased in regions where the level of change associated with the geographic area is deemed to be high and/or the spatial resolution may be reduced in regions where the level of change associated with the geographic area is deemed to be low. In some embodiments, the spatial resolution may be varied alongside the frequency of image capture. In other embodiments, the spatial resolution may remain unchanged whilst the frequency of image capture is changed, and vice versa.

The system and methods of the present disclosure provide a technical effect by allowing for optimization of image-data capture, so as to give precedence to geographic areas that are of greater interest and which may require more frequent updating. More particularly, mapping of geographic areas can be conducted using aerial and/or satellite images of the regions in question. By capturing images of the same area at intervals over time, it is possible to identify changes occurring in that area, and to update the map to record those changes. For example, the images can be analysed to identify new features (e.g., buildings, roads) that have been created in the period since the last image of the area was taken, and a map of that area can then be updated to include these new developments.

Embodiments described herein can help to address problems encountered with conventional image acquisition systems. For example, conventional methods often result in large amounts of imagery data being acquired, only some of which will show regions that are undergoing change and which therefore need updating on the map. This in turn imposes a computational burden in that large amounts of imagery data must be captured and stored. The data must also then be sifted through in order to identify the possibly small number of images that show changes in a particular geographic region, and which therefore require updating on the map.

In contrast, embodiments of the invention seek to identify particular areas that are undergoing higher levels of change and to adjust the acquisition of images accordingly. For example, geographic areas that are undergoing a rapid increase in infrastructure, with an accompanying increase in the number of roads and/or buildings can be given higher priority when determining a strategy for acquiring imagery data. Tasking an image acquisition system based, at least in part, on change detection according to example aspects of the present disclosure represents a more efficient approach to geographic image acquisition. This can allow an image acquisition system to better allocate its resources to areas of higher level of importance and/or that are experiencing higher levels of change.

Additionally, the use of a machine-learned models (as described herein) to determine change on a granular, cellular level can allow for the determination of change using lower resolution images. More particularly, by identifying change on a granular, cellular level of an image in a binary manner (e.g., whether change has or has not occurred), the computing system can use lower-resolution image data without having to determine a type or magnitude of change within the smaller, sub-regions, which would require higher resolution images. Use of lower resolution imaging can lead to lower image acquisition costs (e.g., via use of cheaper, lower resolution platform hardware) as well as allow the image acquisition system and/or machine learning computing system to operate at a lower bandwidth.

The systems and methods of the present disclosure provide an improvement to imagery acquisition and analysis computer technology. For instance, the systems can tailor image acquisition by analyzing at least a subset of the plurality of images to determine an occurrence of one or more changes associated with the geographic area and determining a level of change associated with the geographic area based, at least in part, on the occurrence of the one or more changes associated with the geographic area. Moreover, the computing systems can detect change using lower resolution imagery by inputting data descriptive of one or more image cells (of the images) into a machine-learned binary classifier model and receiving an output from the binary classifier model. The output can be descriptive of the occurrence of the change associated with the target, sub-region (e.g., represented in a cell) of the geographic area. This can allow the computing technology to operate at a lower bandwidth, experience faster data download/upload (e.g., of lower resolution images), and save computational resources (and costs) which can be allocated to other analytical and/or image processing operations.

FIG. 1 depicts an example system 100 according to example embodiments of the present disclosure. The system 100 can include a machine learning computing system 102 and an image acquisition system 104. The computing system 102 and/or the image acquisition system 104 can be configured to communicate and/or transfer data between one another via a direct connection and/or can be coupled via one or more communications network(s).

The computing system 102 can be associated with a mapping service provider such as, Google Maps or Google Earth developed by Google Inc. (Mountain View, Calif.), or other suitable geographic service. The computing system 102 can include one or more computing device(s) 106. As will be further described herein, the computing device(s) 106 can include one or more processor(s) and one or more memory device(s). The one or more memory device(s) can store instructions that when executed by the one or more processor(s) cause the one or more processor(s) to perform operations and functions, for example, such as those described herein for analyzing images and tasking the image acquisition system 104.

The image acquisition system 104 can be configured to manage and acquire image data associated with one or more geographic area(s). The image acquisition system 104 can include one or more computing device(s) that include one or more processor(s) and one or more memory device(s). The one or more memory device(s) can store instructions that when executed by the one or more processor(s) cause the one or more processor(s) to perform operations and functions, for example, such as those for acquiring and managing the acquisition of imagery data.

The image acquisition system 104 can include one or more image-capturing platform(s) 108A-B configured to acquire images associated with a geographic area. The image-capturing platforms 108A-B can include one or more street-level platforms 108A (e.g., automobiles, aerial platforms travelling at a lower altitude to acquire street-level images, fixed structures configured to capture street-level images, other ground-based imaging platforms) and/or aerial platforms 108B (e.g., aircrafts, helicopters, unmanned aerial vehicles (UAVs), balloons, satellites, fixed structures configured to capture overhead images, other overhead imaging platforms). The image-capturing platforms 108A-B can configured to acquire images of a geographic area based, at least in part, on an image acquisition pattern 110A-B, respectively. The image acquisition pattern 110A-B may comprise one or more image acquisition parameter(s). For example, the acquisition pattern 110A-B can include data descriptive of a travel path (e.g., driving path, flight path, flight plan, flight trajectory), one or more location(s) (e.g., identifiers/coordinates for locations for which images are to be acquired), one or more time(s) (e.g., acquisition times, active times, passive times, download times), one or more image acquisition frequencies (e.g., number of times images of an area are captured), one or more zoom level(s), a spatial resolution of the images, and/or other information associated with the acquisition of image data of geographic areas. The image acquisition system 104 can control the image-capturing platform(s) 108A-B by adjusting an image acquisition pattern 110A-B (e.g., the image acquisition parameter(s)) and/or sending a control command to the image-capturing platform(s) 108A-B. By using the systems and methods of the present disclosure, the image-capturing platform(s) 108A-B can capture lower resolution images. As such, the image-capturing hardware can be less expensive than required for higher resolution images. Moreover, less bandwidth is needed for the image acquisition system 104 to obtain captured images from the image-capturing platform(s) 108A-B. Also, use of lower resolution imagery data can lead to lower download/downlink times from the image-capturing platform(s) 108A-B.

The system 100 can further include an accessible image database 112 that stores imagery of geographic areas. The image database 112 can be associated with the computing system 102, the image acquisition system 104, and/or another computing system 114, separate from the machine learning computing system and the image acquisition system. The image database 112 can store various types of image data associated with geographic areas. For instance, the image data can include ground-level images (e.g., street-level panoramic images, sets of light detection and ranging (LIDAR) data, other imagery at or near the level of the ground) as well as overhead images (e.g., images with overhead view). The images can be optical images, infrared images, LIDAR data images, hyperspectral images, or any other type of imagery. The images can be acquired by the image-capturing platforms 108A-B, user-submitted imagery (e.g., imagery captured by user), and/or otherwise acquired (e.g., purchased). The images can be lower resolution, as described herein.

Figure 2:
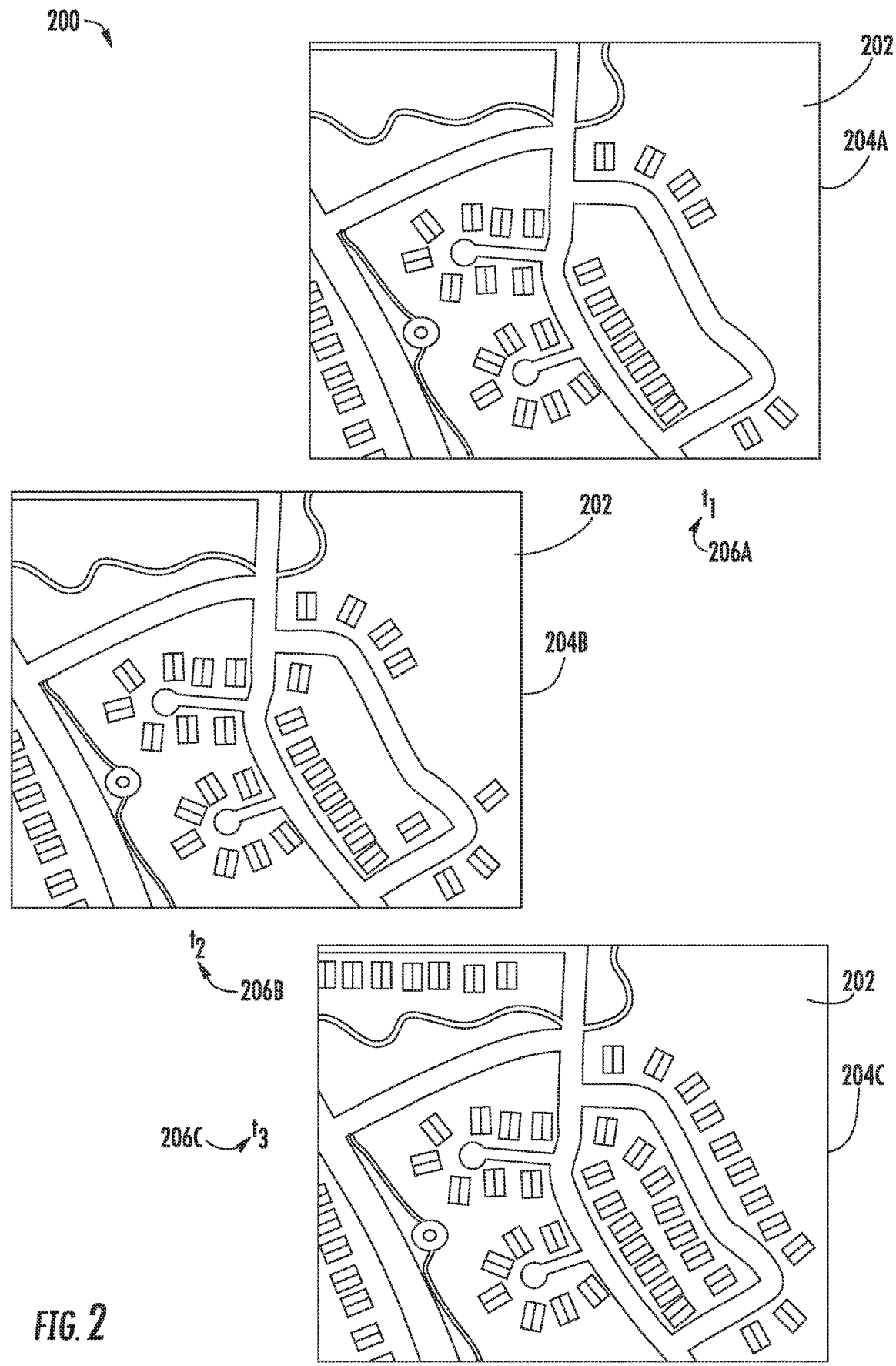
FIG. 2 depicts an example plurality of images of a geographic area according to example embodiments of the present disclosure.

The computing device(s) 106 can be configured to obtain data 116 descriptive of a plurality of images that depict at least a portion of a geographic area. For instance, FIG. 2 depicts an example plurality of images 200 of a geographic area 202 according to example embodiments of the present disclosure. The geographic area 202 shown in FIG. 2 includes a residential neighborhood, but is not intended to be limiting. The geographic area 202 can include a region of a celestial body (e.g., Earth, moon, Mars, other body), region of a country, a state, a municipality, an area defined by land boundaries, a neighborhood, a subdivision, a school district, a shopping center, an office park, body of water, waterway, etc. Each image 204A-C of the plurality of images 200 can depict at least a portion of the geographic area 202. Moreover, each image can be associated with and/or captured at a different time. For example, a first image 204A can be captured at a first time 206A, a second image 204B can be captured at a second time 206B (different than the first time 206A), and a third image 204C can be captured at a third time 206C (different than the first and second times 206A-B). The images 204A-C can be like images to facilitate comparison. While FIG. 2 shows only three images of the plurality of images 200, those of ordinary skill in the art would understand that more or less (e.g., two) images can be included in the plurality of images 200. In some implementations, the data 116 can be obtained from the image database 112, the image acquisition system 104, and/or the one or more other computing device(s) 114.

Returning to FIG. 1, the computing device(s) 106 can be configured to obtain location data 118 associated with a plurality of user devices 120 (e.g., mobile device, personal communication device, smartphone, navigation system, laptop computer, tablet, wearable computing device, other computing device). The location data 118 can be descriptive of a location of a user device and/or a number of user devices 120 located at the geographic area 202. For instance, the location data 118 can include one or more raw location report(s) that include a geocode that identifies a latitude and longitude associated with the respective user device 120.

Each of the location report(s) can include at least a set of data descriptive of an associated location and time. The user devices 120 can provide the location data 118 (e.g., descriptive of the plurality of location reports) to the computing device(s) 106 and/or the computing device(s) 106 can obtain the location data 118 from another computing device. The computing device(s) 106 can be configured to determine a number of user devices located at the geographic area 202 based, at least in part, on the location data 118 (e.g., via aggregation of location reports).

The computing device(s) 106 can be configured to determine a level of importance 122 (e.g., $L_{IMP}$) associated with the geographic area 202 based, at least in part, on the location data 118. The level of importance 122 can be indicative of a level of interest in the geographic area 202 based, at least in part, on the number of user devices and/or users indicated to be located at the geographic area 202 (e.g., within a certain time period). The time period can be a recent time period (e.g., a day, a week, a month, a year, a multiple year period). By way of example, the location data 118 can indicate that the number of users (e.g., of reporting user devices 120) located at the geographic area 202 (e.g., a residential neighborhood) has been high within a recent time frame (e.g., the last few months). In this specific example, the term "high" can be relative to the number of users (and/or user devices) typically or historically located at the geographic area 202. This higher number of users can be indicative of a higher level of importance (e.g., user interest, potential area of change, potential construction) associated with the geographic area 202.

In some implementations, the computing device(s) 106 can identify the geographic area 202 based, at least in part, on location data. For instance, in the event that the level of importance 122 associated with the geographic area 202 is high, the computing device(s) 106 can identify the geographic area 202 (e.g., neighborhood) as an area of interest for which it should determine the occurrence of change. Accordingly, the computing device(s) 106 can obtain data 116 that is descriptive of the plurality of images 200 (e.g., depicting at least a portion of a geographic area 202) based, at least in part, on the determined level of importance 122 (e.g., high level of importance indicating user interest). Additionally, and/or alternatively, the computing device(s) 106 can instruct the image acquisition system 104 (e.g., via control command 124) to obtain images associated with the geographic area 202. The image acquisition system 104 can receive the control command 124, and if needed, the image acquisition system 104 can adjust one or more acquisition pattern(s) 110A-B associated with one or one or more image-capturing platform(s) 108A-B to acquire recent, new, current, etc. images depicting at least a portion of the geographic area 202. Such images can be included in the data 116 (or other data) sent to and/or obtained by the computing device(s) 106 for image analysis with respect to the geographic area 202.

The computing system 102 can include one or more machine-learned models configured to identify an occurrence of one or more change(s) associated with the geographic area 202. The models can be or can otherwise include various machine-learned models such as neural networks (e.g., deep neural networks) or other multi-layer non-linear models. For example, the computing system 102 can include a machine-learned binary classifier model 126. The binary classifier model 126 can be trained to identify the occurrence of a change within the geographic area 202. For example, in some implementations, the system 100 can further include a training computing system 128. The training computing system 128 can be separate from the computing system 102 and/or can be a portion of the computing system 102.

Figure 3:
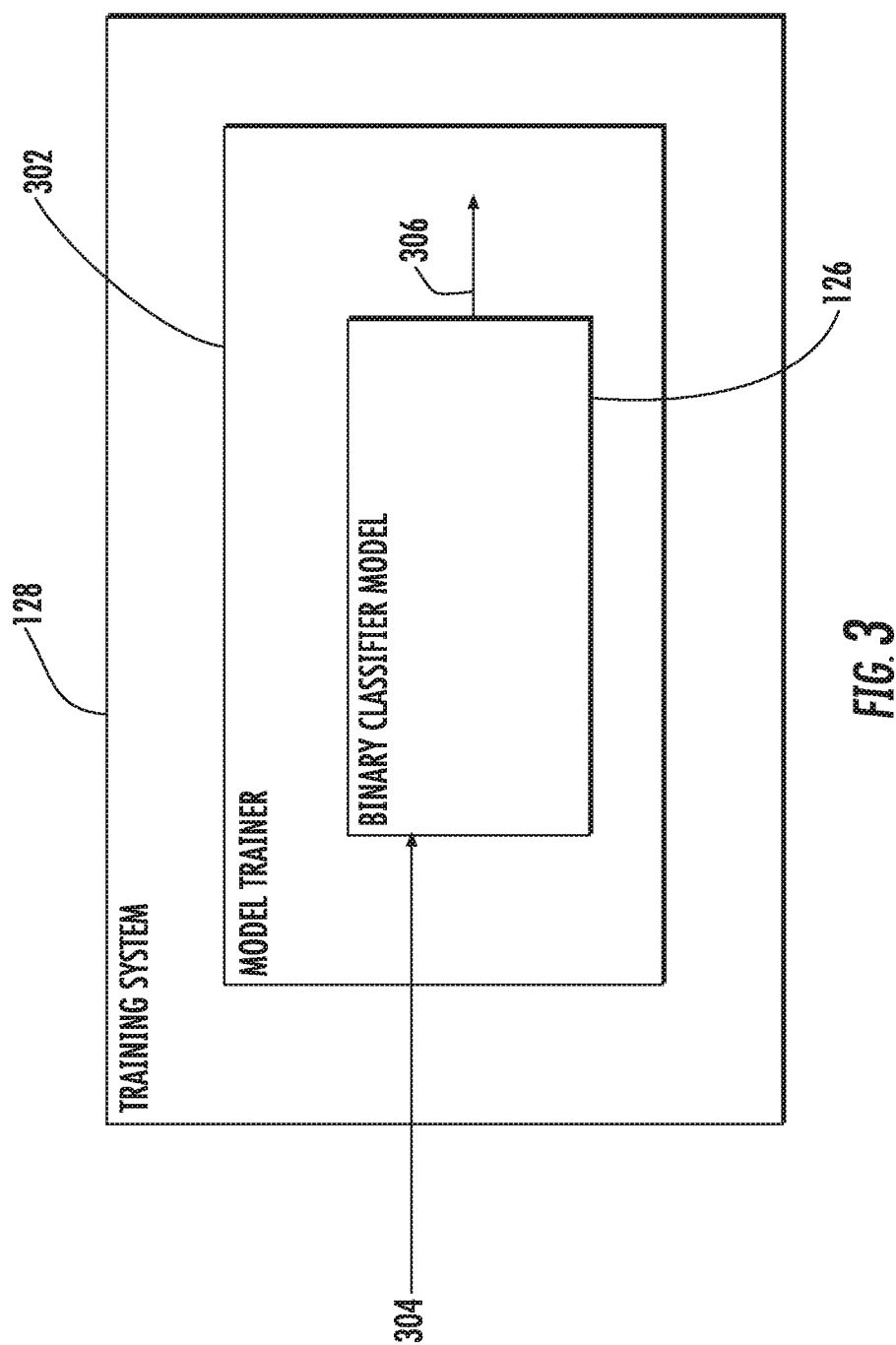
FIG. 3 illustrates the training of a machine-learned model according to example embodiments of the present disclosure.

FIG. 3 illustrates the training of an example machine-learned model according to example embodiments of the present disclosure. The training computing system 128 can include a model trainer 302 that trains, for example, the binary classifier model 126 stored at the machine learning computing system 102 using various training or learning techniques. In particular, the model trainer 302 can train the binary classifier model 126 based on a set of training data 304. In some implementations, the training data 304 can be provided or otherwise selected by the computing system 102 (e.g., from the database 112).

In some implementations, the model trainer 302 can train the machine-learned binary classifier model 126 using training data 304 descriptive of imagery that depicts known instances where change has occurred and/or known instances where change has not occurred. For example, known instances where change has occurred can correspond to historical and/or expert-identified instances of change within a geographic area. Known instances where change has not occurred can also correspond to historical and/or expert-identified instances where change has not occurred within a geographic area. For example, a model can be trained using training data 304 that includes pairs of images that are labeled as either depicting change or not depicting change ("binary training data"). Additionally, and/or alternatively, the training data 304 could be data that includes labels according to some change metric (e.g., one to one-hundred, type of change). In some implementations, the training data 304 can be labeled according to other ground-truth collection systems. In some implementations, the training data 304 can include a time series of imagery depicting a geographic area, each training example providing information sufficient to determine, for each image in the time series of imagery, a difference between images captured at different times.

Additionally, and/or alternatively, the training data 304 can include lower resolution images, such that the machine-learned model can learn to evaluate images of lower resolution. This can ultimately allow the computing system 102 to evaluate images of lower resolution, which can lead to usage of a wider range of images, faster processing time, as well as increased bandwidth for image transfer.

The training computing system 128 can train a machine learned model based, at least in part, on the training data 304. For instance, the training computing system 128 can input training data 304 (e.g., pairs of images identified as either depicting change or not depicting change). The training computing system 128 can receive a training output 306 descriptive of the model's classification of the occurrence of change within the training data 304 (e.g., whether change occurred has occurred or whether change has not occurred). The training computing system 128 can analyze the training output 306 to determine the accuracy of the machine-learned model. For instance, the training computing system 128 can compare the output 306 to the training data 304 to determine whether the model correctly identified the occurrence of change. If further training is required (e.g., to increase one or more confidence level(s), to increase accuracy), the training computing system 128 can provide additional training data 304 and/or indicate that adjustments may need to be made to the model.

By way of example, the machine-learned binary classifier model 126 can be trained to identify the occurrence of a change based, at least in part, on a comparison of one or more visual characteristic(s) associated with two or more images. The visual characteristic(s) can include depicted objects, pixel color, hue, intensity, tone, other characteristics, etc. The binary classifier model 126 can be trained to identify the visual characteristic(s) associated with at least a portion of an image. By way of example, the machine-learned binary classifier model 126 can be trained (e.g., via training data 304) to identify a first set of visual characteristic(s) in a first portion (e.g., cell) of the first image 202A and a second set of visual characteristic(s) in a second portion (e.g., cell) of the second image 202B. The machine-learned binary classifier model 126 can be trained to identify the occurrence of one or more change(s) in the geographic area 202 based, at least in part, on a comparison of the first set of visual characteristic(s) and the second set of visual characteristic(s), as further described below.

Returning to FIG. 1, the computing device(s) 106 can be configured to analyze, at least a subset of, the plurality of images 200 to determine an occurrence of one or more changes associated with the geographic area 202. For instance, the computing device(s) 106 can analyze images (e.g., 204-C) on a granular, cellular level to identify change within a sub-region of the geographic area 202 in a binary manner. This can include, for example, classifying whether a change has not occurred in a sub-region of the geographic area 202 (e.g., "0") or whether a change has occurred in a sub-region of the geographic area 202 (e.g., "1") based on the comparison of two or more images at a granular, cellular level. By identifying the change on in a binary manner within the sub-regions of the geographic area 202, the computing system 102 can utilize lower resolution images for imagery comparison, than may be needed to determine a magnitude of change within an individual target, sub-region.

Figure 4:
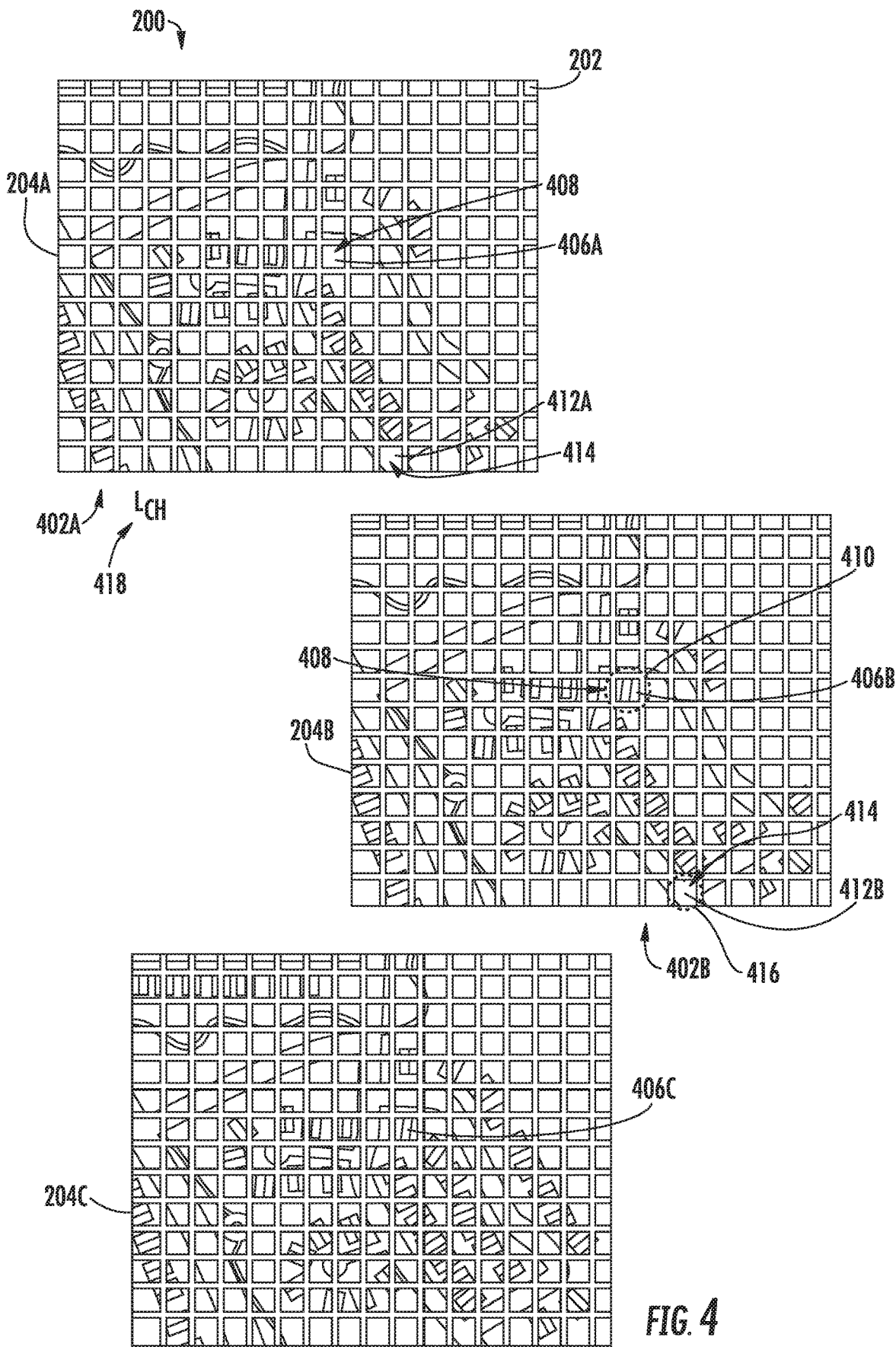
FIG. 4 depicts an example plurality of images split into portions according to example embodiments of the present disclosure.

FIG. 4 depicts the example plurality of images 200 split into portions according to example embodiments of the present disclosure. For example, the computing device(s) 106 can identify a first plurality of cells 402A associated with a first image 202A of the plurality of images 200 and a second plurality of cells 402B associated with a second image 202B of the plurality of images 200. A cell can be a portion of an image. A cell can include, for instance, an area made up of pixels of the respective image. In some implementations, the computing device(s) 106 can identify the cells 402A-B based, at least in part, on a number of pixels that are intended to define the mathematical area of an individual cell. In some implementations, the number of pixels and/or mathematical area can be pre-defined, while in some implementations, the number of pixels and/or mathematical area can be selected based, at least in part, on conditions (e.g., size, resolution, view angle, etc.) associated with the images of the plurality of images 200. Each cell 402A-B can be associated with a particular sub-region of the geographic area 202. In some implementations, the cells 402A-B can be identified such that one or more particular sub-region(s) are represented in the respective cells.

The computing device(s) 106 can be configured to identify, for each image of at least a subset of the images 200, a cell associated with a sub-region of the geographic area 202. For instance, the computing device(s) 106 can be configured to select a first cell 406A of the first plurality of cells 402A and a second cell 406B of the second plurality of cells 402B. Both the first cell and the second cell can be associated with a sub-region 408 of the geographic area 202. By way of example, the geographic area 202 can be a neighborhood and the sub-region 408 can be associated with a sub-region of the neighborhood, such as a land plot within the neighborhood. The sub-region 408 associated with the first cell 406A is the same as the sub-region 408 associated with the second cell 406B to facilitate the comparison of the first and second cells. The image 204A and, thus, the cell 406A, can be associated with the first time 206A. The image 204B (and the cell 406B) can be associated with the second time 206B, which is different than the first time 206A. As such, the computing device(s) 106 can analyze the image cells to identify whether a change occurred in the sub-region 408 between the first and second times 206A-B.

Figure 5:
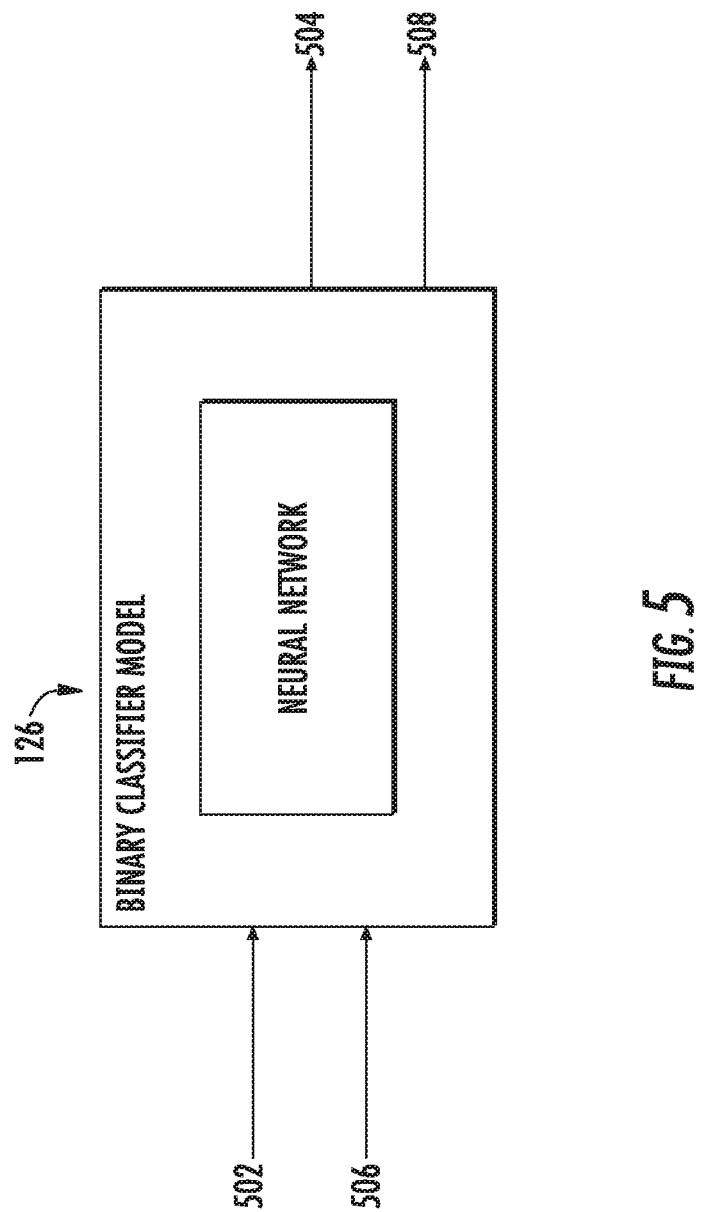
FIG. 5 depicts an example machine-learned model according to example embodiments of the present disclosure.

The computing device(s) 106 can be configured to input data descriptive of at least a subset of the images 200 into the machine-learned binary classifier 126. As shown in FIG. 5, the computing device(s) 106 can input data 502 descriptive of the first image 204A and the second image 204B into the machine-learned binary classifier model 126 to identify an occurrence of one or more change(s) associated with the geographic area 202. For instance, the computing system 102 can be configured to input data 502 descriptive of the first cell 406A and the second cell 406B into the machine-learned binary classifier model 126 to identify an occurrence of a change associated with the sub-region 408 of the geographic area 202. The data 502 can include image data associated with the sub-region depicted in each of the respective cells. For example, the data 502 can include data descriptive of the pixels, include in the cells 406A-B, data descriptive of the visual characteristics of such pixels, and/or other data or metadata associated with the images 204A-B and/or individual cells. The binary classifier model 126 can examine and compare (e.g., using its neural networks) the visual characteristics of the cells 406A-B to identify an occurrence of a change—which can be whether change has occurred (e.g., with respect to the sub-region) or whether change has not occurred (e.g., with respect to the sub-region). The computing system 102 can be configured to receive a first output 504 from the binary classifier model 126. The output 504 can be descriptive of the occurrence of the change associated with the sub-region 408 of the geographic area 202.

By way of example, with reference again to FIG. 4, the machine-learned binary classifier model 126 can analyze the first set of visual characteristics associated with the first cell 406A and the second set of visual characteristics associated with the second cell 406B. As shown in FIG. 4, the sub-region 408 does not include any portion of a structural asset in the first cell 406A of first image 204A taken at the first time 206A (e.g., showing an empty land plot). In the second cell 406B, the sub-region 408 includes at least a portion of a structural asset (e.g., building). The binary classifier model 126 can analyze the cells to determine whether the object depiction, pixel color, intensity, other visual characteristics, etc. of the first cell 406A are different than those of the second cell 406B. In the event that the binary classifier model 126 can determine that there is a difference between the respective cells 406A-B that is indicative of a change (e.g., the addition of a structural asset) above a confidence level, the binary classifier model 126 can identify the occurrence of a change 410 within the sub-region 408 (e.g., change having occurred). The confidence level can be developed and/or refined during the training of the binary classifier model 126 and/or during data analysis.

The first output 504 can indicate that change associated with the sub-region 408 of the geographic area 202 has occurred. For instance, the change 410 associated with the sub-region 408 can be, for example, building churn (e.g., a change in one or more buildings). The output 504 can be a "1", which can indicate that the binary classifier model 126 has determined that a change 410 has occurred in the sub-region 408 based on the images 204A-B. In some implementations, the output 504 may be represented by other numbers (e.g., weighted by sub-region) and/or characters.

While FIG. 4 depicts the change 410 as associated with a structural asset, this is not intended to be limiting. The change 410 can be associated with other elements depicted in an image, such as transportation assets (e.g., roads, travel ways), environmental assets (e.g., plants, soil, waterways), agricultural assets (e.g., crops, farm land, irrigation systems), etc.

As shown in FIG. 5, the computing device(s) 106 can be configured to provide data 506 descriptive of other cells of the first and second pluralities of cells 402A-B as another input to the binary classifier model 126 to identify an occurrence of one or more change(s) associated with one or more other sub-region(s) of the geographic area 202. The computing device(s) 106 can receive a second output 508 from the binary classifier model 126. The second output 508 can be descriptive of the occurrence of one or more change(s) associated with one or more of the other sub-region(s) of the geographic area 202.

For example, as shown in FIG. 4, the computing device(s) 106 can input data descriptive of cells 412A-B, which include a depiction of a transportation asset (e.g., neighborhood road) within sub-region 414. The binary classifier model 126 can compare the cells 412A-B (e.g., the visual characteristics associated therewith). In the event that the binary classifier model 126 determines that there is a slight or no difference between the respective characteristics of the cells 412A-B (e.g., above a confidence level), the binary classifier model 126 can identify the occurrence of the change 416 as: no change having occurred within the sub-region 414. For example, the binary classifier model 126 can determine that no road churn (e.g., a change in one or more travel ways) has occurred within the sub-region 414. Accordingly, the second output 508 can indicate that change associated with the sub-region 414 of the geographic area 202 has not occurred. For instance, the output 508 can be a "0", which can indicate that binary classifier model 126 has determined that no change has occurred in the sub-region 414 based on the images 204A-B. By using the binary classifier model 126, the systems and methods described herein can evaluate the change of a geographic area 202 using lower resolution images, as described herein.

The above-described analysis can be repeated for one or more other cell(s) of one or more other image(s) of the plurality of images 200. For example, the computing device(s) 106 can input data associated with other images (e.g., third image 204C) into the binary classifier model 126. The data associated with the other images can be descriptive of cells associated with the same sub-region 408 to determine if additional changes have occurred in the sub-region 408 (e.g., between the second time 206B and third time 206C). Additionally, and/or alternatively, the data descriptive of the other images can be descriptive of cells associated with one or more different sub-region(s) of the geographic area 202. This can allow the computing device(s) 106 to determine if one or more change(s) have occurred in the other sub-regions of the geographic area 202. In some implementations, this can be repeated until a certain number (e.g., majority, all), percent, ratio, etc. of the cells, images, and/or sub-regions have been analyzed by the binary classifier model 126 in the manner described above.

The computing device(s) 106 can determine a level of change 418 associated with the geographic area 202 based, at least in part, on the occurrence of one or more change(s) (e.g., 410, 412) associated with the geographic area 202. As described above, the level of change 418 can be the overall amount of change (e.g., to its structural assets, transportation assets, environmental assets, agricultural assets, other assets) experienced by the geographic area 202. In some implementations, the computing device(s) 106 can determine the level of change by aggregating the change occurrences (e.g., 410, 412) determined for the sub-regions of the geographic area 202.

For example, the computing device(s) 106 can aggregate the binary classifications (e.g., 0, 1) determined for each sub-region (e.g., 408, 414) of the geographic area 202 and/or identified in the associated output (e.g., 504, 508). The level of change 418 for a geographic area 202 can be determined by adding the binary classifications (e.g., 0, 1) determined for each sub-region (e.g., 408, 414) of the geographic area 202. For example, the geographic area 202 can be divided into 224 cells, each depicting a sub-region. The binary classifier model 126 can determine that a change has not occurred in 150 of the cells and/or sub-regions (e.g., outputting a "0"), while a change has occurred in 74 of the cells and/or sub-regions (e.g., outputting a "1"). The level of change 418 for the geographic area 202 can, thus, be 74, representing a summation of the binary classifications (e.g., 150 "0's"+74 "1's"). This value can further be normalized (e.g., 74/(74+150)=0.33) to normalize away the size of cell.

In some implementations, the level of change 418 can indicate the level of change per square distance. For example, the computing device(s) 106 can determine the level of change by dividing the aggregated level of change by the square distance of the geographic area 202 represented in the images. In some implementation, the computing device(s) 106 can determine the level of change based, at least in part, on the change classifications identified in a group of cells (e.g., cell 408A and the immediately surrounding eight cells) divided by the square distance represented by the sub-regions depicted in those cells.

In some implementations, the computing device(s) 106 can determine the level of change 418 based, at least in part, on a weighted approach. The computing device(s) 106 can assign a weight to the cells of an image such that change identified in certain cells are afforded a higher weight for the level of change 418 and/or certain cells are afforded a lower weight for the level of change 418. By way of example, the computing device(s) 106 may afford a higher weight to a change in a sub-region 408 of a cell 406A-B located towards the center of the image 204A-B, and a lower weight to a change in a sub-region 414 of a cell 412A-B located at a periphery of the image 204A-B. To do so, the computing device(s) 106 can multiply the binary classification (e.g., 0, 1) by a numerical weight identifier (e.g., percent, fraction) and perform an aggregation of the weighted classifications to determine the level of change 418.

Returning to FIG. 1, the computing device(s) 106 can provide a control command 129 to the image acquisition system 104 to adjust an acquisition of imagery data associated with the geographic area 202 based, at least in part, on the level of change 418. For instance, in the event that the level of change 418 associated with the geographic area 202 is above a threshold 130 the control command 129 can instruct the image acquisition system 104 to increase the acquisition of imagery data associated with the geographic area 202. The threshold 130 can be indicative of a significant level of change and/or rate of change such that the acquisition of imagery data of the geographic area 202 should be adjusted. By way of example, in the event that the level of change 418 associated with the geographic area 202 is above a threshold 130 (e.g., indicating a high level of change), the control command 129 can instruct the image acquisition system 104 to increase the amount, timing, frequency, etc. with which images of the geographic area 202 are acquired. In the event that the level of change 418 is below the threshold 130 (e.g., indicative of a low level of change or no change has occurred) the computing device(s) 106 may cease providing a command control to adjust the acquisition of imagery data associated with the geographic area 202. In some implementations, if the level of change 418 is low, the computing device(s) 106 can provide a control command to the image acquisition system 104 to decrease the acquisition of imagery data associated with the geographic area 202. The image acquisition system 104 can receive the control command 129 and can adjust imagery acquisition accordingly (e.g., to increase, decrease acquisition via the image-capturing platform(s)).

Figure 6:
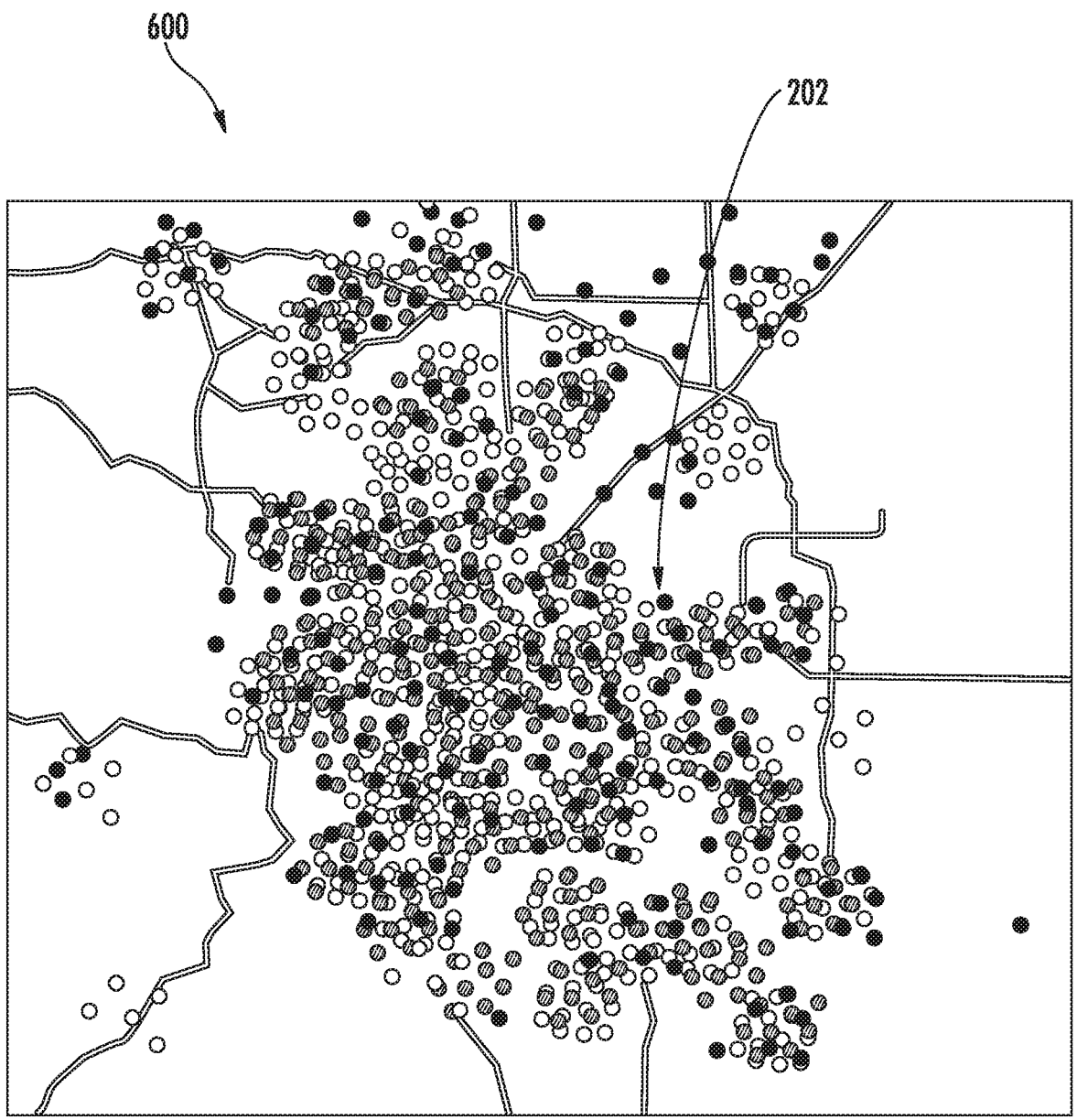
FIG. 6 illustrates a graphical representation indicative of the level of change of a plurality of geographic areas according to example embodiments of the present disclosure.

Additionally, and/or alternatively, the computing device(s) 106 can generate a graphical representation indicative of the level of change 418 associated with the geographic area 202. For instance, FIG. 6 illustrates a graphical representation 600 indicative of the level of change of a plurality of geographic areas according to example embodiments of the present disclosure. As shown, the graphical representation 600 can be, for example, a heatmap indicating the levels of change associated with one or more geographic area(s). In some implementations, the level of change can be represented in another graphical form (e.g., bar chart, pie chart, histogram). The level of change 418 associated with the geographic area 202 (e.g., the neighborhood shown in image 204A) can be represented in the graphical representation 600 with one or more other geographic area(s) (e.g., other neighborhoods) to indicate the relative levels of change across a larger geographic region (e.g., a city). In some implementations, the control command 129 to adjust the acquisition of imagery data associated with the geographic area 202 can be based, at least in part, on the graphical representation 600. For example, the control command 129 can instruct the image acquisition system 104 to adjust one or more acquisition pattern(s) 110A-B based, at least in part, on the graphical representation 600. In this way, the system can effectively allocate its imaging resources to acquire more frequent imagery of geographic areas experiencing higher levels of change and less frequent imagery of geographic areas experiencing lower levels of change. This can provide a more focused, useful set of image data that more accurately reflects the status of geographic areas.

Figure 7:
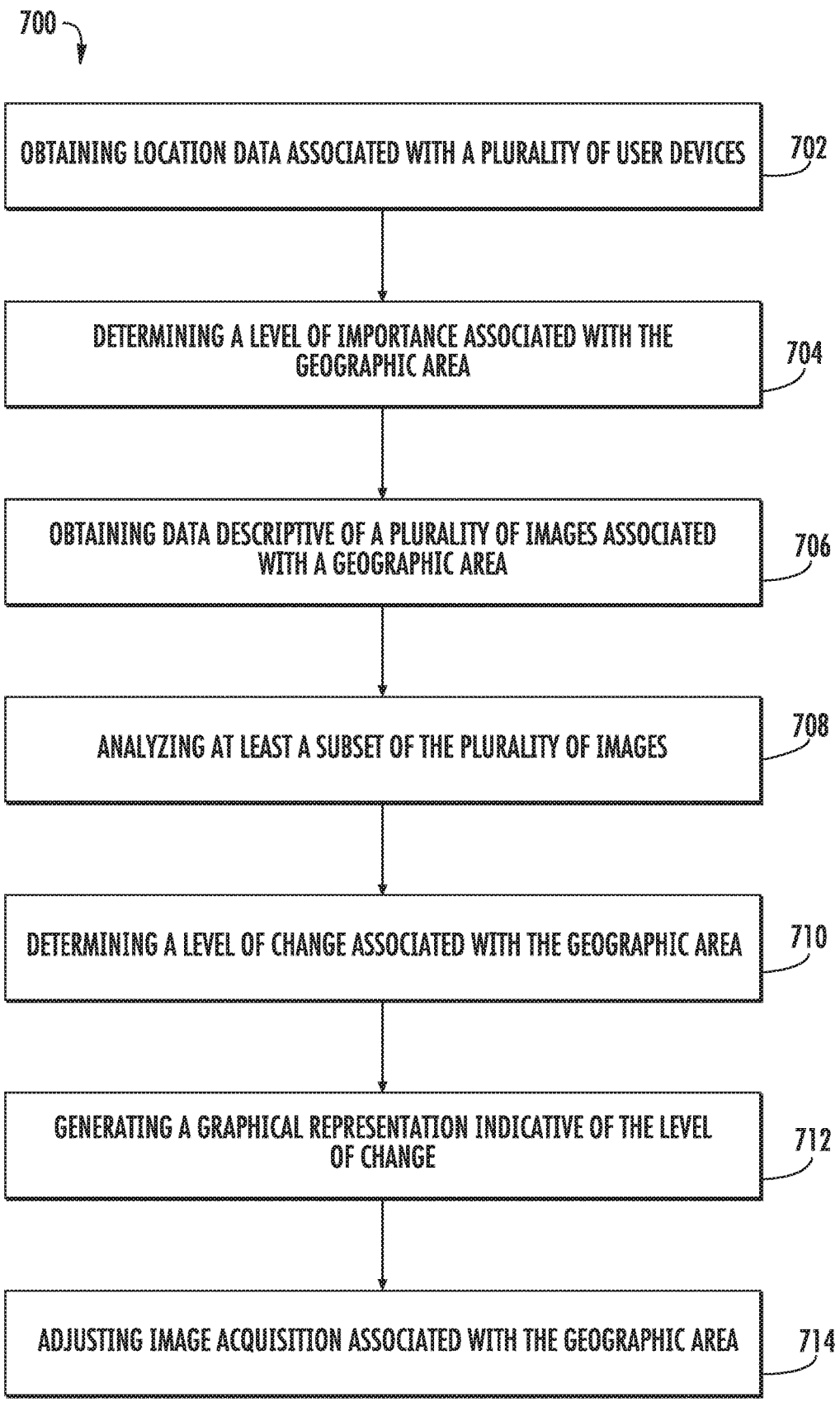
FIG. 7 depicts a flow diagram of an example method according to example embodiments of the present disclosure.

Returning to FIG. 1, the image acquisition system 104 can adjust the acquisition of imagery data associated with the geographic area 202 using a variety of approaches. For instance, the image acquisition system 104 can adjust an acquisition pattern 110A-B associated with at least one of the street-level platforms 108A and the aerial platforms 108B. For example, a travel path 132A-B (e.g., driving path, flight path) and/or a frequency 134A-B (e.g., frequency with which images of the geographic area 202 are captured with the image capturing platforms 108A-B) can be adjusted such that the image capturing platforms 110A-B can capture images associated with the geographic area 202 more or less often. Additionally, and/or alternatively, in some implementations, the image acquisition system 104 can adjust the purchase patterns, download patterns, request patterns, etc. by which the image acquisition system 104 acquires images of the geographic area 202 from other computing device(s) and/or users. For instance, the image acquisition system 104 can request more frequent imagery (e.g., from third parties), more frequently purchase imagery, and/or solicit for imagery of geographic areas experiencing higher levels of change FIG. 7 depicts a flow diagram of an example method 700 according to example embodiments of the present disclosure. One or more portion(s) of method 700 can be implemented by one or more computing device(s) such as, for example, those shown in FIGS. 1 and 9. FIG. 7 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (702), the method 700 can include obtaining location data associated with a plurality of user devices. For instance, the computing device(s) 106 can obtain location data 118 associated with a plurality of user devices 120. The location data 118 can be descriptive of a number of user devices located at a geographic area 202. As described above, the location data 118 can include raw location report(s) descriptive of a geocode that identifies a location associated with the respective user device 120.

At (704), the method 700 can include determining a level of importance associated with the geographic area. For instance, the computing device(s) 106 can determine a level of importance 122 associated with the geographic area 202 based, at least in part, on the number of user devices 120 located at the geographic area 202. The level of importance 122 can be indicative of a level of interest in the geographic area 202, the amount of user traffic associated with the geographic area 202, etc. In some implementations, a higher number of user devices 120 can be indicative of a higher level of importance (e.g., user interest, potential area of change, potential construction) associated with the geographic area 202.

The computing device(s) 106 can identify the geographic area based, at least in part, on the level of importance. For instance, in the event that the number of user devices 120 located at the geographic area is high (e.g., relative to a typical, historical number of user devices located at the geographic area 202), the level of importance associated with the geographic area 202 can be high. Accordingly, the computing device(s) 106 can identify the geographic area 202 as an area-of-interest, for which it should use the systems and methods described herein to determine whether change is occurring in the area.

At (706), the method 700 can include obtaining data descriptive of a plurality of images associated with a geographic area. For instance, the computing device(s) 106 can obtain data 116 descriptive of a plurality of images 200 associated with a geographic area 202. Each image can depict at least a portion of the geographic area 202. Each image having been captured at a different time. For instance, the plurality of images 200 can include a first image 204A captured at a first time 206A (e.g., $t_1$) and second image 204B captured at a second time 206B (e.g., $t_2$). In some implementations, the plurality of images 200 can be acquired by one or more street-level platforms 108A. In some implementations, the plurality of images 200 can be acquired by one or more aerial platforms 108B.

At (708), the method 700 can include analyzing at least a subset of the plurality of images. For instance, the computing device(s) 106 can analyze at least a subset of the plurality of images 200 to determine an occurrence of one or more change(s) associated with the geographic area 202. The computing device(s) 106 can input data 502 descriptive of at least a subset of the images 200 into a machine-learned model (e.g., the binary classifier model 126). In some implementations, the data 502 can be descriptive of at least a portion of each respective image that makes up the subset of images. For example, the data 502 can be descriptive of at least a portion of the first image 204A and at least a portion of the second image 204B.

Figure 8:
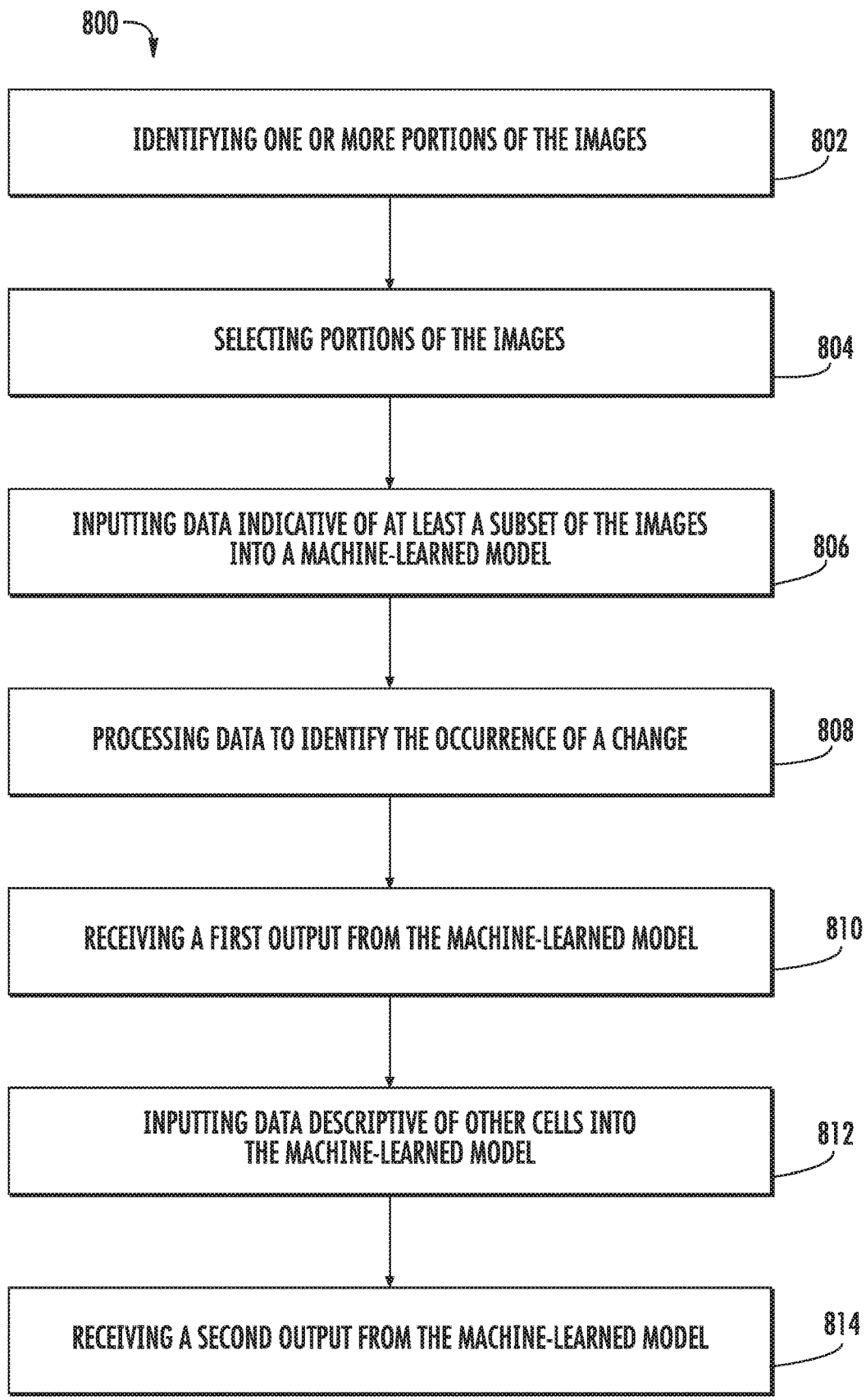
FIG. 8 depicts a flow diagram of an example method according to example embodiments of the present disclosure.

The binary classifier model 126 can identify an occurrence of one or more change(s) associated with the geographic area 202 based, at least in part, on the inputted data 502. For example, FIG. 8 depicts a flow diagram of an example method 800 for analyzing images according to example embodiments of the present disclosure. One or more portion(s) of method 800 can be implemented by one or more computing device(s) such as, for example, those shown in FIGS. 1 and 9. Moreover, one or more steps of the method 800 can be combined with the steps of method 700 such as, for example, at (708). FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (802), the method 800 can include identifying one or more portion(s) of the images. For instance, the computing device(s) 106 can identify a first plurality of cells 402A associated with a first image 204A of the plurality of images 200 and a second plurality of cells 402B associated with a second image 204B of the plurality of images 200. Each cell can depict a sub-region 408 (e.g., land plot) of the larger geographic area 202 (e.g., neighborhood).

At (804), the method can include selecting portions of the images. The computing device(s) 106 can select a first portion of the first image 204A and a second portion of the second image 204B. For example, the computing device(s) 106 can select a first cell 406A of the first plurality of cells 402A and a second cell 406B of the second plurality of cells 402B. Both the first cell 406A and the second cell 406B can be associated with a sub-region 408 of the geographic area 202.

At (806), the method can include inputting data descriptive of at least a subset of the images into a machine-learned model. The computing device(s) 106 can input data 502 descriptive of at least a subset of the images into a machine-learned model. For instance, the computing device(s) 106 can input data 502 descriptive of portions of each of the images 200 into the binary classifier model 126. By way of example, the computing device(s) 106 can input data 502 descriptive of the first cell 406A and the second cell 406B into the machine-learned binary classifier model 126 to identify an occurrence of a change 410 associated with the sub-region 408 of the geographic area 202. As described herein, the data 502 can include image data associated with the sub-region depicted in each of the respective selected image portions (e.g., cells) such as, for example, data descriptive of the pixels that make up the image portions (e.g., cells) and/or the visual characteristics (e.g., color, intensity, depicted objects) associated with such pixels (and/or the cells). In some implementations, the computing device(s) 106 can input data associated with at least a subset of the images 200 and the binary classifier model 126 can process the images to identify portions (e.g., cells) of the images and select portions of the image(s), as in (802) and (804).

At (808), the method 800 can include processing inputted data to identify an occurrence of one or more changes associated with the geographic area. For instance, a machine-learned model can process the data descriptive of the portions of the first and second images 204A-B. By way of example, the binary classifier model 126 can process the data descriptive of the first cell 406A and the second cell 406B to identify the occurrence of one or more change(s) 410 associated with the sub-region 408 of the geographic area 202.

As described herein, the binary classifier model 126 can be trained to identify the occurrence of the change (e.g., 410) associated with the sub region 408 of the geographic area 202 based, at least in part, on a comparison of one or more visual characteristic(s) of each of the cells 406A-B. Thus, the binary classifier model 126 can compare the visual characteristics of the images 200 to identify the occurrence of one or more change(s). For example, the binary classifier model 126 can compare the visual characteristics of the first cell 406A (e.g., the pixels associated therewith) and the second cell 406B (e.g., the pixels associated therewith) to identify an occurrence of one or more change(s) 410 associated with the sub-region 408 of the geographic area 202.

At (810), the method 800 can include receiving an output from the machine-learned model. For instance, the computing device(s) 106 can receive a first output 504 from the binary classifier model 126. The output 504 can be descriptive of the occurrence of one or more change(s) 410 associated with the sub-region 408 of the geographic area 202. The one or more change(s) associated with the geographic area 202 can include at least one of a change associated with a structural asset (e.g., building, portion of building, other structure), and a change associated with a transportation asset (e.g., road, travel way. For instance, the change 410 associated with the geographic area 202 can include at least one of building churn (e.g., the addition, removal, change of a building, other structural assets) and/or road churn (e.g., the addition, removal, change of a travel way, other transportation assets). In some implementations, the change can be associated with another type of asset (e.g., agricultural).

At (812), the method 800 can include inputting data descriptive of other cells into the machine-learned model. In some implementations, the computing device(s) 106 can input data descriptive of one or more other portion(s) of the first and second images 204A-B into the binary classifier model 126 to detect change. For instance, the computing device(s) 106 can provide data 506 descriptive of other cells (e.g., 412A-B) of the first and second pluralities of cells 402A-B as another input to the binary classifier model 126 to identify an occurrence of one or more change(s) associated with one or more other sub-region(s) (e.g., 414) of the geographic area 202. The computing device(s) 106 can receive a second output 508 from the binary classifier model 126, at (814). The second output 508 can be descriptive of the occurrence of one or more change(s) associated with one or more of the other sub-region(s) (e.g., 414) of the geographic area 202.

In some implementations, the computing device(s) 106 can input data descriptive of one or more other image(s) (e.g., 204C) of the plurality of images 200 into the binary classifier model 126. The inputted data can be descriptive of one or more portion(s) (e.g., cells) of the other image(s) (e.g., 204C). The binary classifier model 126 can process such data, in a manner similar to that described above, to identify the occurrence of other change(s) associated with the sub-region 408 and/or to identify one or more other change(s) associated with other sub-region(s) of the geographic area 202. The second output 508 (and/or another output) can be descriptive of the occurrence of the one or more change(s) associated with the sub-region 408 and/or another sub-region of the geographic area 202 based, at least in part, on the inputted data from the other image(s) (e.g., 204C).

Returning to FIG. 7, at (710), the method 700 can include determining a level of change associated with the geographic area. In some implementations, the computing device(s) 106 can determine the level of change 418 associated with the geographic area 202 based, at least in part, on the first output 504 and the second output 508, from the binary classifier model 126. The computing device(s) 106 can determine a level of change 418 associated with the geographic area 202 based, at least in part, on the occurrence of the one or more change(s) (e.g., 410, 416) associated with the geographic area 202 (e.g., indicated in the outputs from the model). In some implementations, the computing device(s) 106 can determine the level of change 418 associated with the geographic area 202 (e.g., neighborhood) by aggregating the change occurrences determined for each sub-region (e.g., land plots), as described herein. Additionally, and/or alternatively, the overall level of change can be based on change per square distance and/or weighting change within certain sub-regions, as described herein.

At (712), the method 700 can include generating a graphical representation indicative of the level of change. For instance, the computing device(s) 106 can generate a graphical representation 600 indicative of the level of change 418 associated with the geographic area 202. The graphical representation 600 can indicate the level of change 418 associated with the geographic area 202 relative to one or more other geographic area(s) (e.g., as shown in FIG. 6). This can show the different levels of change occurring in different geographic areas throughout, for example, a country, the world, etc. In some implementations, the graphical representation can indicate which sub-regions of the geographic area 202 have experienced change.

At (714), the method 700 can include adjusting image acquisition associated with the geographic area. The computing device(s) 106 can provide a control command 129 to an image acquisition system 104 to adjust an acquisition of imagery data associated with the geographic area 202 based, at least in part, on the level of change 418. For instance, as described herein, the image acquisition system 104 can include one or more image-capturing platforms 108A-B. The computing device(s) 106 can provide the control command 129 to the image acquisition system 104 to adjust an acquisition pattern 110A-B associated with the one or more image-capturing platform(s) 108A-B based, at least in part, on the level of change 418. The image acquisition system 104 can receive the control command and can adjust image acquisition accordingly. Adjusting the acquisition pattern 110A-B can include adjusting a frequency 134A-B with which images of the geographic area 202 are captured by respective ones of the image capturing platform(s) 108A-B. For example, the frequency 134A-B with which images of the geographic area 202 are captured can be increased subject to the determined level of change 418 associated with the geographic area 200 being above a threshold 130. Additionally, and/or alternatively, acquisitions of imagery data can include the adjustment of purchasing strategies and/or solicitations for user submissions.

In some implementations, the computing device(s) 106 can provide the control command 129 to the image acquisition system 104 to adjust the acquisition pattern associated with the one or more image-capturing platform(s) 110A-B based, at least in part, on the level of change 418 and the level of importance 122 associated with the geographic area 202. The image acquisition system 104 can adjust the image acquisition as directed (e.g., via the image-capturing platforms 108A-B). For example, in the event that the level of change 418 is high, and the level of importance 122 is high, the computing device(s) 106 can determine to increase the acquisition of imagery data associated with the geographic area 202 (e.g., by increasing the frequency 134A-B with which images of the geographic area 202 are captured). In the event that the level of change 418 is high, but the level of importance 122 is low, the computing device(s) 106 can determine to maintain the current acquisition of imagery data associated with the geographic area 202 and/or moderately increase the acquisition of such imagery data. In the event that the level of change 418 is low, but the level of importance 122 is high, the computing device(s) 106 can determine to maintain and/or decrease the acquisition of imagery data associated with the geographic area 202. In the event that the level of change 418 is low and the level of importance 122 is low, the computing device(s) 106 can determine to decrease the acquisition of imagery data associated with the geographic area 202. In this way, the systems and methods of the present disclosure can allocate imaging resources to capture imagery of areas that are experiencing higher levels of change, while conserving resources that would otherwise be used for areas that are experiencing lower levels of change.

In some implementations, a geographic area with a high level of importance, where change is possible (though not common) can be given a higher priority if the impact of the change would be high. For instance, certain geographic areas (e.g., airports, malls, other popular attractions) have a moderate level of change (e.g., moderate road, building churn) but have a high level of importance (e.g., user device presence) and/or other indictors of interest (e.g., online views of an associated business webpage). Change in such areas could have a significant impact given the location and/or population of such areas. In some implementations, the computing device(s) 106 can assign a priority to these geographic areas (of higher level of importance). Accordingly, the computing device(s) 106 can adjust imagery acquisition (e.g., via one or more control command(s) to the image acquisition system 104) such that the images of these high priority areas are regularly acquired, allowing the computing device(s) to regularly monitor change in these areas where change (although not common) may have a significant impact.

Figure 9:
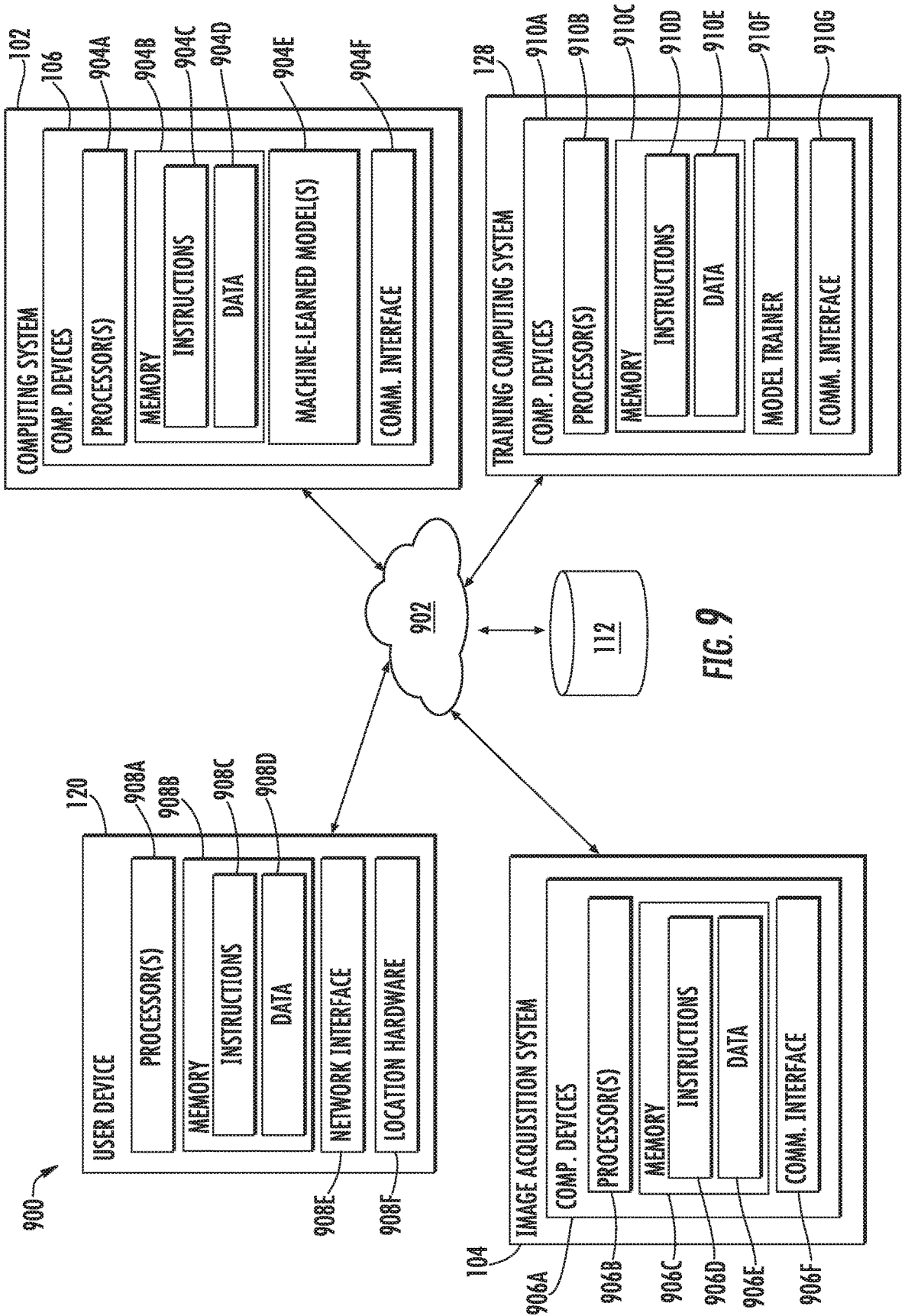
FIG. 9 depicts an example system according to example embodiments of the present disclosure.

FIG. 9 depicts an example system 900 according to example embodiments of the present disclosure. The system 900 can include the machine learning computing system 102, the image acquisition system 104, the plurality of user devices 120, and/or the training computing system 128. The components of system 900 can communicate with one or more of the other component(s) of system 900 via one or more communication network(s) 902 to, for example, exchange data.

The computing system 102 includes one or more computing device(s) 106. The computing device(s) 106 include one or more processor(s) 904A and one or more memory device(s) 904B. The one or more processor(s) 904A can be any suitable processing device (e.g., a processor core, a microprocessor, an ASIC, a FPGA, a controller, a microcontroller, etc.) and can be one processor or a plurality of processors that are operatively connected. The memory device(s) 904B can include one or more non-transitory computer-readable storage medium(s), such as RAM, ROM, EEPROM, EPROM, flash memory devices, magnetic disks, etc., and/or combinations thereof.

The one or more memory device(s) 904B can store information accessible by the one or more processor(s) 904A, including computer-readable instructions 904C that can be executed by the one or more processor(s) 904A. The instructions 904C can be any set of instructions that when executed by the one or more processor(s) 904A, cause the one or more processor(s) 904A to perform operations. In some embodiments, the instructions 904C can be executed by the one or more processor(s) 904A to cause the one or more processor(s) 904A to perform operations, such as any of the operations and functions for which the computing system 102 and/or the computing device(s) 106 are configured, the operations for tasking an image acquisition system (e.g., methods 700, 800), and/or any other operations or functions for obtaining images, analyzing the images, determining a level of change, and providing control commands to adjust the acquisition of imagery data, as described herein. The instructions 904C can be software written in any suitable programming language or can be implemented in hardware. Additionally, and/or alternatively, the instructions 904C can be executed in logically and/or virtually separate threads on processor(s) 904A.

The one or more memory device(s) 904B can also store data 904D that can be retrieved, manipulated, created, or stored by the one or more processors 904A. The data 904D can include, for instance, data associated with images, data associated with a geographic area, location data, data associated with a machine-learned model, training data, and/or other data or information. The data 904D can be stored in one or more databases. The one or more databases can be connected to the computing device(s) 106 by a high bandwidth LAN or WAN, or can also be connected to computing device(s) 106 through network(s) 902. The one or more databases can be split up so that they are located in multiple locales.

As described herein, the computing device(s) 106 can store or otherwise include one or more machine-learned models 904E such as, for example, the binary classifier model 126. The machine-learned models 904E can be or can otherwise include various machine-learned models such as neural networks (e.g., deep neural networks) or other multi-layer non-linear models. The models 904E can be accessed by the processors 904A to perform the operations and functions for analyzing images and tasking an image acquisition system, as described herein.

The computing device(s) 106 can also include a network interface 904F used to communicate with one or more other component(s) of the system 900 (e.g., image acquisition system 104, user device(s) 120, training computing system 128) over the network(s) 902. The network interface 904F can include any suitable components for interfacing with one or more network(s), including for example, transmitters, receivers, ports, controllers, antennas, or other suitable components.

In some implementations, the machine learning computing system 102 can include or is otherwise implemented by one or more server computing device(s). In instances in which the machine learning computing system 102 includes plural server computing devices, such server computing devices can operate according to sequential computing architectures, parallel computing architectures, or some combination thereof.

The image acquisition system 104 can include one or more computing device(s) 906A. The computing device(s) 906A can include one or more one or more processor(s) 906B and one or more memory device(s) 906C. The one or more processor(s) 906B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 906C can include one or more non-transitory computer-readable storage medium(s), such as RAM, ROM, EEPROM, EPROM, flash memory devices, magnetic disks, etc., and/or combinations thereof.

The memory device(s) 906C can include one or more computer-readable media and can store information accessible by the one or more processors 906B, including instructions 906D that can be executed by the one or more processors 906B. For instance, the memory 906C can store instructions 906D for acquiring imagery data, as described herein. In some embodiments, the instructions 906D can be executed by the one or more processor(s) 906B to cause the one or more processor(s) 906B to perform operations, such as any of the operations and functions for which the image acquisition system 104 is configured (e.g., providing image data, adjusting acquisition of imagery, communicating with image-capturing platforms) and/or any other operations or functions of the image acquisition system 104, as described herein. The instructions 906D can be software written in any suitable programming language or can be implemented in hardware. Additionally, and/or alternatively, the instructions 906D can be executed in logically and/or virtually separate threads on processor(s) 906B.

The one or more memory device(s) 906C can also store data 906E that can be retrieved, manipulated, created, or stored by the one or more processors 906B. The data 906E can include, for instance, image data associated with one or more geographic areas, acquisition patterns, etc. In some implementations, the database 112 can be included or otherwise associated with the image acquisition system 104. In some implementations, the data 906E can be received from another device (e.g., a remote accessible image database).

The computing device(s) 906A can also include a network interface 906F used to communicate with one or more other component(s) of the system 900 (e.g., computing system 102, database 112) over the network(s) 902. The network interface 906F can include any suitable components for interfacing with one or more network(s), including for example, transmitters, receivers, ports, controllers, antennas, or other suitable components.

Each of the user devices 120 can be any suitable type of computing device, such as a laptop, desktop, other personal computing device, navigation system, smartphone, tablet, wearable computing device, other mobile computing device, a display with one or more processors, server computing device, or any other type of computing device. A user device 120 can include one or more processor(s) 908A and one or more memory device(s) 908B. The one or more processor(s) 908A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 908B can include one or more non-transitory computer-readable storage medium(s), such as RAM, ROM, EEPROM, EPROM, flash memory devices, magnetic disks, etc., and/or combinations thereof.

The memory device(s) 908B can include one or more computer-readable media and can store information accessible by the one or more processor(s) 908A, including instructions 908C that can be executed by the one or more processor(s) 908A. For instance, the memory device(s) 908B can store instructions 908C for determining device location and providing location data to the computing system 102, as described herein. In some embodiments, the instructions 908C can be executed by the one or more processor(s) 908A to cause the one or more processor(s) 908A to perform operations, such as any of the operations and functions for which the user device(s) 102 are configured, and/or any other operations or functions of the user device(s) 102, as described herein. The instructions 908C can be software written in any suitable programming language or can be implemented in hardware. Additionally, and/or alternatively, the instructions 908C can be executed in logically and/or virtually separate threads on processor(s) 908A.

The one or more memory device(s) 908B can also store data 908D that can be retrieved, manipulated, created, or stored by the one or more processors 908A. The data 908D can include, for instance, data associated with the user device (e.g., location data). In some implementations, the data 908D can be received from another device (e.g., a remote computing system for determining location).

A user device 120 can include various location computing hardware 908F for determining the location of a user device. For instance, the location hardware 908F can include sensors, GPS computing devices, etc. that can allow a user device 120 to determine its location. In some implementations, the location computing hardware 908F can be used in conjunction with data received from one or more other remote computing device(s) to determine the location of the user device 120.

A user device 120 can also include a network interface 908F used to communicate with one or more other components of system 900 (e.g., computing system 102) over the network(s) 902. The network interface 908F can include any suitable components for interfacing with one or more network(s), including for example, transmitters, receivers, ports, controllers, antennas, or other suitable components.

In some implementations, the system 900 can further include a training computing system 128 communicatively coupled over the network(s) 902. The training computing system 128 can be separate from the machine learning computing system 102 or can be a portion of the machine learning computing system 102. The training computing system 128 can include one or more computing device(s) 910A.

The computing device(s) 910A can include one or more processor(s) 910B and one or more memory device(s) 910C. The one or more processor(s) 910B can include any suitable processing device, such as a microprocessor, controller, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 910C can include one or more non-transitory computer-readable storage medium(s), such as RAM, ROM, EEPROM, EPROM, flash memory devices, magnetic disks, etc., and/or combinations thereof.

The memory device(s) 910C can include one or more computer-readable media and can store information accessible by the one or more processor(s) 910B, including instructions 910D that can be executed by the one or more processor(s) 910B. For instance, the memory 910C can store instructions 910D for training machine-learned models, as described herein. In some embodiments, the instructions 910D can be executed by the one or more processor(s) 910B to cause the one or more processor(s) 910B to perform operations, such as any of the operations and functions for which the training computing system 128 is configured (e.g., training the binary classifier model) and/or any other operations or functions of training computing system 128, as described herein. The instructions 910D can be software written in any suitable programming language or can be implemented in hardware. Additionally, and/or alternatively, the instructions 910D can be executed in logically and/or virtually separate threads on processor(s) 910B.

The one or more memory device(s) 910D can also store data 910E that can be retrieved, manipulated, created, or stored by the one or more processors 910B. The data 910E can include, for instance, training data, etc. In some implementations, the data 910E can be received from another device (e.g., a remote accessible image database).

The computing device(s) 910A can also include one or more model trainer(s) 910F such as, for example, model trainer 302. The model trainer(s) 910F can include computer logic utilized to provide desired functionality. The model trainer(s) 910F can be implemented in hardware, firmware, and/or software controlling a general purpose processor. For example, in some implementations, the model trainer(s) 910F can include program files stored on a storage device, loaded into a memory and executed by one or more processors (e.g., 910B). In other implementations, the model trainer(s) 910F can include one or more sets of computer-executable instructions that are stored in a tangible computer-readable storage medium such as RAM hard disk or optical or magnetic media.

The computing device(s) 910A can also include a network interface 910G used to communicate with one or more other component(s) of the system 900 (e.g., computing system 102) over the network(s) 902. The network interface 910G can include any suitable components for interfacing with one or more network(s), including for example, transmitters, receivers, ports, controllers, antennas, or other suitable components.

The network(s) 902 can be any type of communications network, such as a local area network (e.g. intranet), wide area network (e.g. Internet), cellular network, or some combination thereof and can include any number of wired or wireless links. The network(s) 902 can also include a direct connection between one or more component(s) of system 900. In general, communication over the network(s) 902 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a server can instead be performed at a user device. Likewise, computing tasks discussed herein as being performed at the user device can instead be performed at the server.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of tasking an image acquisition system, comprising:
    obtaining, by one or more computing devices, location data and data descriptive of a plurality of images associated with a geographic area, each image depicting at least a portion of the geographic area, and each image having been captured at a different time, wherein the location data is associated with a number of users located at the geographic area within a time period;
    analyzing, by the one or more computing devices, at least a subset of the plurality of images to determine an occurrence of one or more changes associated with the geographic area;
    determining, by the one or more computing devices, a level of importance associated with the geographic area based at least in part on the location data;
    determining, by the one or more computing devices, a level of change associated with the geographic area based at least in part on the occurrence of the one or more changes associated with the geographic area; and
    in response to the level of change exceeding a threshold that is indicative of a significant level of change in the geographic area, providing, by the one or more computing devices, a control command to an image acquisition system comprising one or more image capturing platforms associated with the geographic area, wherein the control command adjusts a frequency of acquisition of imagery data by the one or more image capturing platforms based at least in part on the level of importance.

2. The computer-implemented method of claim 1, wherein analyzing, by the one or more computing devices, at least the subset of the plurality of images to determine the occurrence of one or more changes associated with the geographic area comprises:
    identifying, by the one or more computing devices, a first plurality of cells associated with a first image of the plurality of images, and a second plurality of cells associated with a second image of the plurality of images;
    selecting, by the one or more computing devices, a first cell of the first plurality of cells and a second cell of the second plurality of cells, wherein both the first cell and the second cell are associated with a sub-region of the geographic area;
    inputting, by the one or more computing devices, data descriptive of the first cell and the second cell into a machine-learned binary classifier model to identify the occurrence of one or more changes associated with the sub-region of the geographic area; and
    receiving, by the one or more computing devices, a first output from the binary classifier model, the output descriptive of the occurrence of the one or more changes associated with the sub-region of the geographic area.

3. The computer-implemented method of claim 2, wherein analyzing, by the one or more computing devices, at least the subset of the plurality of images to determine the occurrence of one or more changes associated with the geographic area further comprises:
    providing, by the one or more computing devices, data descriptive of other cells of the first and second pluralities of cells as another input to the binary classifier model to identify an occurrence of one or more changes associated with one or more other sub-regions of the geographic area; and
    receiving, by the one or more computing devices, a second output from the binary classifier model, the second output descriptive of the occurrence of one or more changes associated with one or more of the other sub-regions of the geographic area.

4. The computer-implemented method of claim 3, wherein determining, by the one or more computing devices, the level of change associated with the geographic area based at least in part on the one or more changes associated with the geographic area comprises:
    determining, by the one or more computing devices, the level of change associated with the geographic area based at least in part on the first output and the second output.

5. The computer-implemented method of claim 2, wherein the machine-learned binary classifier model is trained to identify the occurrence of the one or more changes associated with the sub-region of the geographic area based at least in part on a comparison of one or more visual characteristics of each of the cells.

6. The computer-implemented method of claim 1, wherein the image acquisition system comprises one or more image-capturing platforms, and wherein providing, by the one or more computing devices, the control command to the image acquisition system comprises adjusting an acquisition pattern associated with the one or more image-capturing platforms based at least in part on the level of change.

7. The computer-implemented method of claim 6, wherein the location data is associated with a plurality of user devices, the location data descriptive of a number of user devices located at the geographic area, and further comprising:
    determining, by the one or more computing devices, the level of importance associated with the geographic area based at least in part on the number of user devices located at the geographic area.

8. The computer-implemented method of claim 7, wherein providing, by the one or more computing devices, the control command to the image acquisition system to adjust the acquisition of imagery data associated with the geographic area comprises:
    providing, by the one or more computing devices, the control command to the image acquisition system to adjust the acquisition pattern associated with the one or more image-capturing platforms based at least in part on the level of change and the level of importance associated with the geographic area.

9. The computer-implemented method of claim 6, wherein adjusting the acquisition pattern comprises adjusting a frequency with which images of the geographic area are captured by respective ones of the image capturing platforms.

10. The computer-implemented method of claim 9, wherein the frequency with which images of the geographic area are captured is increased subject to the determined level of change associated with the geographic area being above a threshold.

11. The computer-implemented method of claim 6, wherein the plurality of images are acquired by one or more aerial platforms.

12. The computer-implemented method of claim 6, wherein the plurality of images are acquired by one or more street-level platforms.

13. The computer-implemented method of claim 1, further comprising:
generating, by the one or more computing devices, a graphical representation indicative of the level of change associated with the geographic area; and
wherein the control command to adjust the acquisition of imagery data associated with the geographic area is based at least in part on the graphical representation.

14. The computer-implemented method of claim 1, wherein the one or more changes associated with the geographic area comprise at least one of a change associated with a structural asset and a change associated with a transportation asset.

15. The computer-implemented method of claim 14, wherein the change associated with the geographic area comprises at least one of building churn and road churn.

16. A computing system for tasking an image acquisition system, comprising:
at least one processor; and
at least one tangible, non-transitory computer-readable medium that stores instructions that, when executed by the at least one processor, cause the computing system to:
obtain location data and data descriptive of a plurality of images, each image depicting at least a portion of the geographic area, and each image having been captured at a different time, wherein the location data is associated with a number of users located at the geographic area within a time period;
analyze at least a subset of the plurality of images to determine an occurrence of one or more changes associated with the geographic area;
determine a level of importance associated with the geographic area based at least in part on the location data;
determine a level of change associated with the geographic area based at least in part on the occurrence of one or more changes associated with the geographic area; and
in response to the level of change exceeding a threshold that is indicative of a significant level of change in the geographic area, provide a control command to an image acquisition system comprising one or more image capturing platforms associated with the geographic area, wherein the control command adjusts a frequency of acquisition of imagery data by the one or more image capturing platforms based at least in part on the level of importance.

17. The computing system of claim 16 wherein to analyze the subset of the plurality of images to determine the occurrence of one or more changes associated with the geographic area, the instructions cause the system to:
identify a first plurality of cells associated with a first image of the plurality of images, and a second plurality of cells associated with a second image of the plurality of images;
select a first cell of the first plurality of cells and a second cell of the second plurality of cells, wherein both the first cell and the second cell are associated with a sub-region of the geographic area;
input data descriptive of the first cell and the second cell into a machine-learned binary classifier model to identify an occurrence of a change associated with the sub-region of the geographic area; and
receive a first output from the binary classifier model, the output descriptive of the occurrence of the change associated with the sub-region of the geographic area.

18. The computing system of claim 16, wherein the plurality of images are acquired by at least one of an aerial platform and a street-level platform, and wherein to provide the control command to the image acquisition system to adjust the acquisition of imagery data associated with the geographic area, the instructions cause the system to:
adjust an acquisition pattern associated with at least one of the aerial platform and the street-level platform.

19. The computing system of claim 16, wherein the location data is associated with a plurality of user devices, and wherein the system is further configured to:
determine a level of importance associated with the geographic area based at least in part on the location data.

20. One or more tangible, non-transitory computer-readable media storing computer-readable instructions that when executed by one or more processors cause the one or more processors to perform operations, the operations comprising:
obtaining location data and data descriptive of a plurality of images associated with a geographic area, each image depicting at least a portion of the geographic area, and each image having been captured at a different time, wherein the location data is associated with a number of users located at the geographic area within a time period;
analyzing at least a subset of the plurality of images to determine an occurrence of one or more changes associated with the geographic area;
determining a level of importance associated with the geographic area based at least in part on the location data;
determining a level of change associated with the geographic area based at least in part on the occurrence of the one or more changes associated with the geographic area; and
in response to the level of change exceeding a threshold that is indicative of a significant level of change in the geographic area, providing a control command to an image acquisition system comprising one or more image capturing platforms associated with the geographic area, wherein the control command adjusts a frequency of acquisition of imagery data by the one or more image capturing platforms based at least in part on the level of importance.

* * * * *